United States Patent
Koyama et al.

(10) Patent No.: US 7,914,038 B2
(45) Date of Patent: Mar. 29, 2011

(54) AIRBAG SYSTEM

(75) Inventors: Toru Koyama, Aichi-ken (JP); Yoshiaki Goto, Aichi-ken (JP); Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 1 day.

(21) Appl. No.: 12/457,171

(22) Filed: Jun. 2, 2009

(65) Prior Publication Data

US 2009/0302582 A1 Dec. 10, 2009

(30) Foreign Application Priority Data

Jun. 4, 2008 (JP) .................................. 2008-147303

(51) Int. Cl.
*B60R 21/16* (2006.01)
(52) U.S. Cl. ..................................................... 280/730.1
(58) Field of Classification Search .............. 280/730.2, 280/729, 743.1, 730.1
See application file for complete search history.

(56) References Cited

U.S. PATENT DOCUMENTS

| 6,260,877 B1 * | 7/2001 | Rasmussen, Sr. ............. 280/729 |
| 6,851,706 B2 * | 2/2005 | Roberts et al. ............. 280/730.1 |
| 6,971,664 B2 * | 12/2005 | Amamori ...................... 280/729 |
| 2003/0116945 A1 * | 6/2003 | Abe ............................... 280/729 |

FOREIGN PATENT DOCUMENTS

| JP | U-S62-43056 | 3/1987 |
| JP | A-2003-170795 | 6/2003 |

* cited by examiner

*Primary Examiner* — Faye M. Fleming
(74) *Attorney, Agent, or Firm* — Posz Law Group, PLC

(57) ABSTRACT

An airbag system includes an airbag, and the airbag includes an airbag body having a passenger-side wall portion that is arranged at a passenger side when having completed deploying and inflating, and a slip cloth that is disposed at an outer surface side of the passenger-side wall portion. The slip cloth formed in a loop shape an axial direction of which is in a left and right direction includes: a front panel portion arranged at a passenger side; an upper back panel portion extending downward from an upper end of the front panel portion; and a lower back panel portion extending upward from a lower end of the front panel portion, and a lower end of the upper back panel portion and an upper end of the lower back panel portion are mutually approximated, and joined to the passenger-side wall portion.

4 Claims, 18 Drawing Sheets

AIRBAG SYSTEM

BACKGROUND OF THE INVENTION

1. Field of the Invention

The present invention relates to an airbag system, and more particularly, to an airbag system that suppresses a load on a passenger when an airbag in the course of deploying and inflating contacts the passenger.

2. Related Art

Conventionally, as an airbag system that suppresses a load on a passenger when an airbag in the course of deploying and inflating contacts the passenger, there has been known one for which a soft outer cover movable with respect to an airbag body is disposed outside the airbag body so that the passenger's face slides on the surface of the airbag body with the soft outer cover to prevent an abrasion (see JP S62-43056U, for example).

Moreover, as the airbag system, there has been known an airbag system including an airbag having an airbag body and a patch, in which the patch is disposed so as to cover at least a surface of a passenger-side wall portion, and is capable of relatively moving with respect to the passenger-side wall portion of the airbag body when it contacts a passenger in the course of deploying and inflating (see JP 2003-170795A, for example). This airbag system has been constructed so that even when the airbag contacts a passenger in the course of deploying and inflating, the patch does not move in contact with the passenger, but the passenger-side wall portion smoothly moves with respect to the patch, and thus suppresses a load to be applied by the airbag to the passenger.

However, the airbag system of JP 2003-170795A has been constructed so that one of the upper end or the lower end of the patch is fixed to the passenger-side wall portion, and the patch covers the surface of the passenger-side wall portion (see FIG. 4 and FIG. 14 to FIG. 16 of JP 2003-170795A). Alternatively, it has been constructed so that both left and right ends of the patch are fixed in the vicinity of both left and right ends of the passenger-side wall portion (see FIG. 17 of JP 2003-170795A).

Therefore, in the airbag system where one of the upper end or the lower end of the patch is fixed to the passenger-side wall portion, the direction in which the patch can move with respect to the passenger-side wall portion is limited to one direction of the fixed side, so that depending on an upward or downward moving direction of the passenger-side wall portion with respect to the passenger, it has been difficult to appropriately suppress a load of the airbag to be applied to the passenger.

Moreover, in the airbag system where both left and right ends of the patch are fixed to the passenger-side wall portion, the distance by which the patch can move with respect to the passenger-side wall portion is short, so that there has been room for improvement in the point of allowing the passenger-side wall portion a large shift movement.

SUMMARY OF THE INVENTION

The present invention has been made in order to solve the above-mentioned problems, and an object thereof is to provide an airbag system that enables a shift movement of the airbag body in both upper and lower directions with respect to a passenger and can easily secure the distance of the shift movement large, and can thus improve an effect of suppressing a load of the airbag on the passenger.

An airbag system according to the present invention is an airbag system including an airbag folded and stored and allowing an inflating gas ejected from an inflator to flow in so as to deploy and inflate, the airbag including an airbag body having a passenger-side wall portion that is arranged at a passenger side when having completed deploying and inflating, and a slip cloth that is disposed at an outer surface side of the passenger-side wall portion, the slip cloth formed in a loop shape an axial direction of which is in a left and right direction including:

a front panel portion arranged at a passenger side;

an upper back panel portion arranged on the passenger-side wall portion at a back side of the front panel portion and extending downward from an upper end of the front panel portion; and a lower back panel portion arranged on the passenger-side wall portion at a back side of the front panel portion and extending upward from a lower end of the front panel portion, and a lower end of the upper back panel portion and an upper end of the lower back panel portion are mutually approximated, and joined to the passenger-side wall portion.

In the airbag system according to the present invention, during actuation, when the airbag contacts a passenger in the course of deploying and inflating, the passenger-side wall portion of the airbag body does not directly contact the passenger, but the front panel portion of the slip cloth contacts the passenger. Then, when the passenger-side wall portion attempts to shift and move upward and downward with respect to the passenger, a contact portion being in contact with the passenger in the front panel portion is integrated by frictional resistance or the like with the passenger and does not move, however, the upper back panel portion and the lower back panel portion at the back side of the contact portion can shift to move upward and downward with respect to the front panel portion. In other words, when the passenger-side wall portion attempts to shift and move upward and downward with respect to the passenger, the slip cloth moves a joint portion of the upper back panel portion and the lower back panel portion to the passenger-side wall portion upward and downward along with the passenger-side wall portion and shifts and moves the joint portion with respect to the contact portion of the front panel portion with the passenger, and as a result, the passenger-side wall portion can shift to move upward and downward with respect to the passenger without applying a load. In addition, the passenger-side wall portion, even if this contacts the passenger with the slip cloth intervening in the course of inflating, shifts to move upward and downward with respect to the passenger, and the airbag body smoothly completes inflation. Therefore, it becomes possible to satisfactorily protect the passenger by the airbag body that has completed inflation, and for example, even if the passenger hits at a position biased upward and downward with respect to the passenger-side wall portion with the slip cloth intervening at the initial contact, the airbag body smoothly completes inflation, and the passenger is received with excellent cushioning characteristics by the passenger-side wall portion that has completed inflation.

In addition, the slip cloth is, in a loop shape where the lower end of the upper back panel portion and the upper end of the lower back panel portion are mutually approximated, connected to the passenger-side wall portion. Therefore, while the front panel portion is made to contact with the passenger, for example, when the passenger-side wall portion attempts to shift and move upward, the slip cloth rolls on the surface of the passenger-side wall portion so that the initial lower end of the front panel portion enters an area of the initial lower back panel portion at the back side and the initial upper end of the upper back panel portion enters an area of the initial front panel portion at the front side. Conversely, when the passenger-side wall portion attempts to shift and move downward, the slip cloth rolls on the surface of the passenger-side wall portion so that the initial upper end of the front panel portion enters the area of the initial upper back panel portion at the back side and the initial lower end of the lower back panel portion enters the area of the initial front panel portion at the front side. In addition, the distance by which the slip cloth can roll upward and downward equals a distance until the joint portion of the upper back panel portion and the lower back panel portion to the passenger-side wall portion is arranged from the uppermost end position to the lowermost end position of the loop-shaped slip cloth, and the slip cloth can roll a distance of about ½ of the perimeter of the slip cloth between the passenger-side wall portion and the passenger, so that the distance of shift movement in the upper and lower direction of the passenger-side wall portion with respect to the passenger can be easily secured large in proportion to increasing the perimeter of the slip cloth.

Accordingly, the airbag system according to the present invention enables a shift movement of the airbag body in both upper and lower directions with respect to a passenger and can easily secure the distance of the shift movement large, and can thus improve an effect of suppressing a load of the airbag on the passenger.

In addition, for the slip cloth, respective width dimensions in the left and right direction of the front panel portion, the upper back panel portion, and the lower back panel portion are made substantially identical from an upper end to a lower end of the slip cloth, and the lower end of the upper back panel portion and the upper end of the lower back panel portion are joined to the passenger-side wall portion across substantially the entire area in the left and right direction.

In the airbag system thus constructed, the width dimensions in the left and right direction of the slip cloth are made substantially identical across the circumferential direction, and the upper and lower back panel portions are joined to the passenger-side wall portion across substantially the entire area in the left and right direction, and thus when folding up the airbag in assembly of the airbag system, assembling work can be easily performed without the slip cloth shifting in the left and right direction with respect to the passenger-side wall portion.

Further, the slip cloth includes, besides the upper and lower back panel portions, a left back panel portion arranged on the passenger-side wall portion at a back side of the front panel portion, and extending rightward from a left end of the front panel portion and a right back panel portion arranged on the passenger-side wall portion at a back side of the front panel portion, and extending leftward from a right end of the front panel portion, and a right end of the left back panel portion and a left end of the right back panel portion are mutually approximated, along with the lower end of the upper back panel portion and the upper end of the lower back panel portion, in the vicinity of a center of the back side of the front panel portion, and joined to the passenger-side wall portion.

According to the airbag system with such a construction, because the slip cloth can roll also in the left and right direction on the surface of the passenger-side wall portion as a result of the deploying and inflating of the airbag, the slip cloth is capable of a large shift movement not only in the upper and lower direction, but also in the left and right direction, a large shift movement of about ½ of the perimeter in the left and right direction, with respect to the passenger-side wall portion.

Accordingly, when the airbag in the course of deploying and inflating contacts the passenger, the passenger-side wall portion is capable of a shift movement not only in both upper and lower directions but also in both left and right directions, with respect to the passenger. In addition, even if the passenger hits the passenger-side wall portion of the airbag body in the course of inflating in a biased manner not only upward and leftward but also leftward and rightward with respect to the passenger-side wall portion of the airbag body in the course of inflating via the slip cloth, the airbag body smoothly completes inflation, and the passenger is received with excellent cushioning characteristics by the passenger-side wall portion that has completed inflation.

DETAILED DESCRIPTION OF THE PREFERRED EMBODIMENTS

Figure 1:
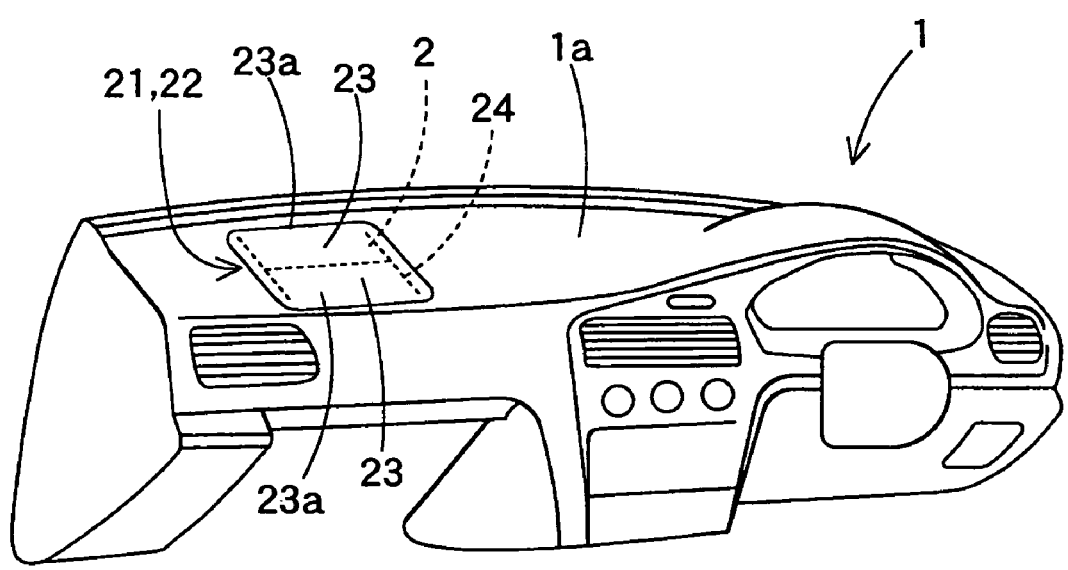
FIG. 1 is a perspective view showing an instrument panel mounted with a passenger seat airbag system, which is the first embodiment of the present invention.
Figure 2:
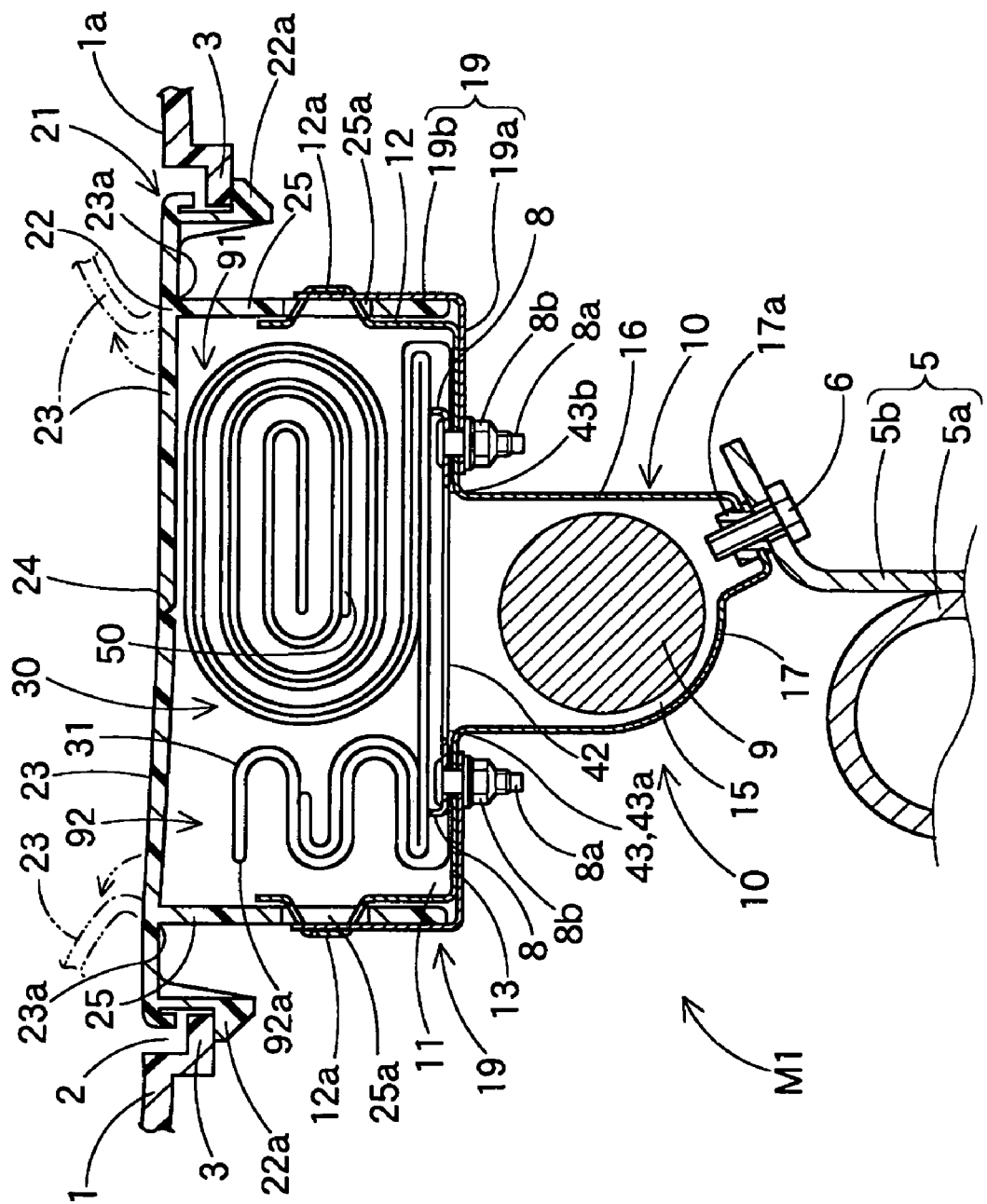
FIG. 2 is a sectional view in the front and rear direction of a vehicle showing the passenger seat airbag system of the first embodiment 1.

Hereinafter, to explain an embodiment of the present invention based on the drawings, a passenger seat airbag system (hereinafter, abbreviated to an "airbag system") M1 being an embodiment of the present invention is, as shown in FIGS. 1 and 2, mounted inside an upper face 1a on the surface of an instrument panel 1, which is a top-mount type. The airbag system M1 includes a folded airbag 30, an inflator 9 for supplying the airbag 30 with an inflating gas, a case 10 for storing and holding the airbag 30 and the inflator 9, a retainer 8 for attaching the airbag 30 to the case 10, an airbag cover 21 for covering the folded airbag 30, and two presser plates 19 for strongly connecting the airbag cover 21 to the case 10.

Also, the front, rear, left, and right in the present specification are, on the basis of a state where the airbag system M1 is mounted on a vehicle moving straight ahead, directions corresponding to the front, rear, left, and right of the vehicle, and being upper and lower in the present specification is on the basis of a state when the airbag 30 has completed deploying and inflating.

The retainer 8 for attaching the airbag 30 to the case 10 is made of a square ring-shaped sheet metal, and provided at predetermined positions thereof with a plurality of bolts 8a extending downward. The retainer 8 is to be attached to the case 10 by inserting each bolt 8a through an attachment hole 44 (see FIG. 3) to be described later of the airbag 30 and inserting the same through a bottom wall portion 17 to be described later of the case 10 and a horizontal plate portion 19a to be described later of the presser plate 19, and screwing a nut 8b with each bolt 8a.

The inflator 9 is, as a cylinder type, stored and held in a lower chamber 15 to be described later of the case 10.

The airbag cover 21 is composed of a ceiling wall portion 22 formed of a thermoplastic elastomer or the like of a polyolefin base, a polyester base, or the like and arranged so as to block an opening 2 of the instrument panel 1 opened in a rectangular shape and a substantially square cylinder-shaped side wall portion 25 extending downward from a lower face of the ceiling wall portion 22. For ceiling wall portion 22, on the inside surrounded by the side wall portion 25, front and rear two flap portions 23 are disposed with a thin-walled to-be-fractured portion 24 arranged therearound. The to-be-fractured portion 24 is arranged substantially in the shape of a letter H when viewed from above the ceiling wall portion 22. The flap portions 23 are, when being pushed by the airbag 30 at the time of inflation to fracture, to open to both sides in the front and rear direction of the vehicle using their end portion sides in the front and rear direction separated from the to-be-fractured portion 24 as hinge portions 23a, as shown by alternate long and two short dashed lines of FIG. 2. Moreover, at edges of the ceiling wall portion 22 in the vehicle front and rear direction, a plurality of locking legs 22a projecting downward are formed. Each locking leg 22a is locked to the lower face side of a flange portion 3 provided in a stepped manner on the periphery of the opening 2 of the instrument panel 1. In the side wall portion 25, at sites in the front and rear direction of the vehicle, a plurality of locking holes 25a penetrating in the front and rear direction of the vehicle are formed, and by use of these locking holes 25a and the presser plates 19, the side wall portion 25 is connected to an upper chamber 11 to be described later of the case 10.

The presser plates 19, each being formed of a sheet metal and in the form of a letter L in section including a horizontal plate portion 19a and a vertical plate portion 19b extending upward from the end portion of the horizontal plate portion 19a, are formed at sites in the front and rear direction of the vehicle of the case 10, respectively. And, in each horizontal plate portion 19a, a through-hole (reference numeral and sign are omitted in the figure) through which each bolt 8a of the retainer 8 is inserted is formed, and the upper end of each vertical plate portion 19b is formed so as to be insertable through a locking protrusion 12a to be described later of the case 10.

The case 10 is made of a sheet metal, and is composed of a rectangular parallelepiped-shaped upper chamber 11 opened at the top and a lower chamber 15 arranged at the lower part side of the case 10 so as to be communicated with the upper chamber 11.

The upper chamber 11 is composed of a substantially square cylinder-shaped peripheral wall portion 12 and a bottom wall portion 13 arranged under the peripheral wall portion 12. On the peripheral wall portion 12, a locking protrusion 12a to be inserted in each locking hole 25a of the airbag cover side wall portion 25 is formed in plurality so as to project outside. In the bottom wall portion 13, a through-hole (reference numeral and sign are omitted in the figure) for inserting therethrough each bolt 8a of the retainer 8 is formed, and at the lower faces of parts in the front and rear direction of the vehicle, the horizontal plate portions 19a of the presser plates 19 are to be arranged in contact, respectively.

The lower chamber 15 includes a substantially square cylinder-shaped peripheral wall portion 16 in a manner extending downward from an inner end portion of the bottom wall portion 13 and a bottom wall portion 17 blocking the lower end of the peripheral wall portion 16. To the bottom wall portion 17, a nut 17a for attaching the case 10 to a body 5 is attached. The bottom wall portion 17, which is to be attached to a bracket 5b extending from a reinforcement 5a on the body 5, is attached to the bracket 5b by screwing a bolt 6 with the nut 17a through a connection hole (reference numeral and sign are omitted in the figure) provided in the bracket 5b.

Figure 3:
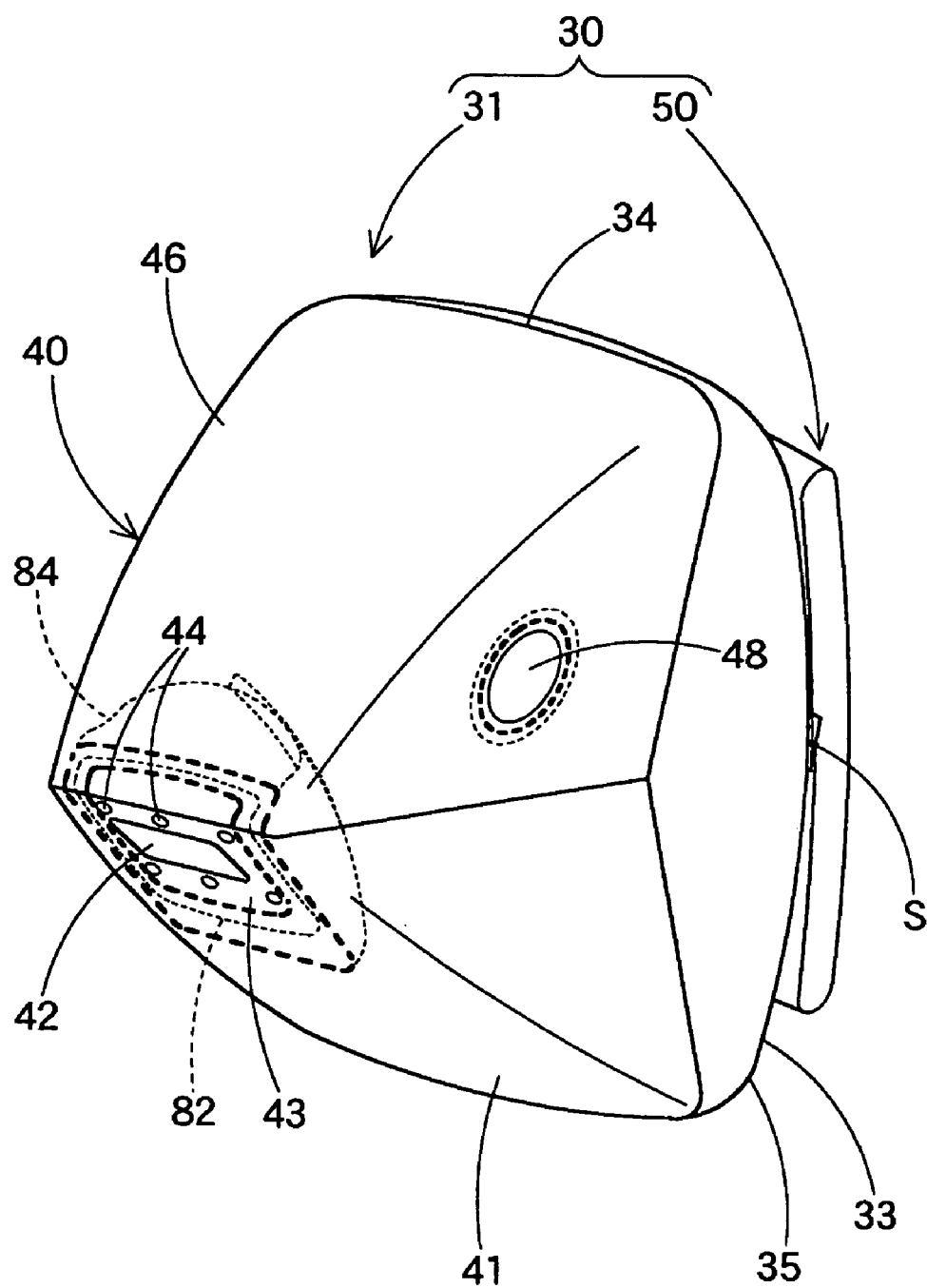
FIG. 3 is a perspective view of a state where an airbag to be used for the first embodiment has been solely inflated, viewed from the front side of a vehicle.
Figure 4:
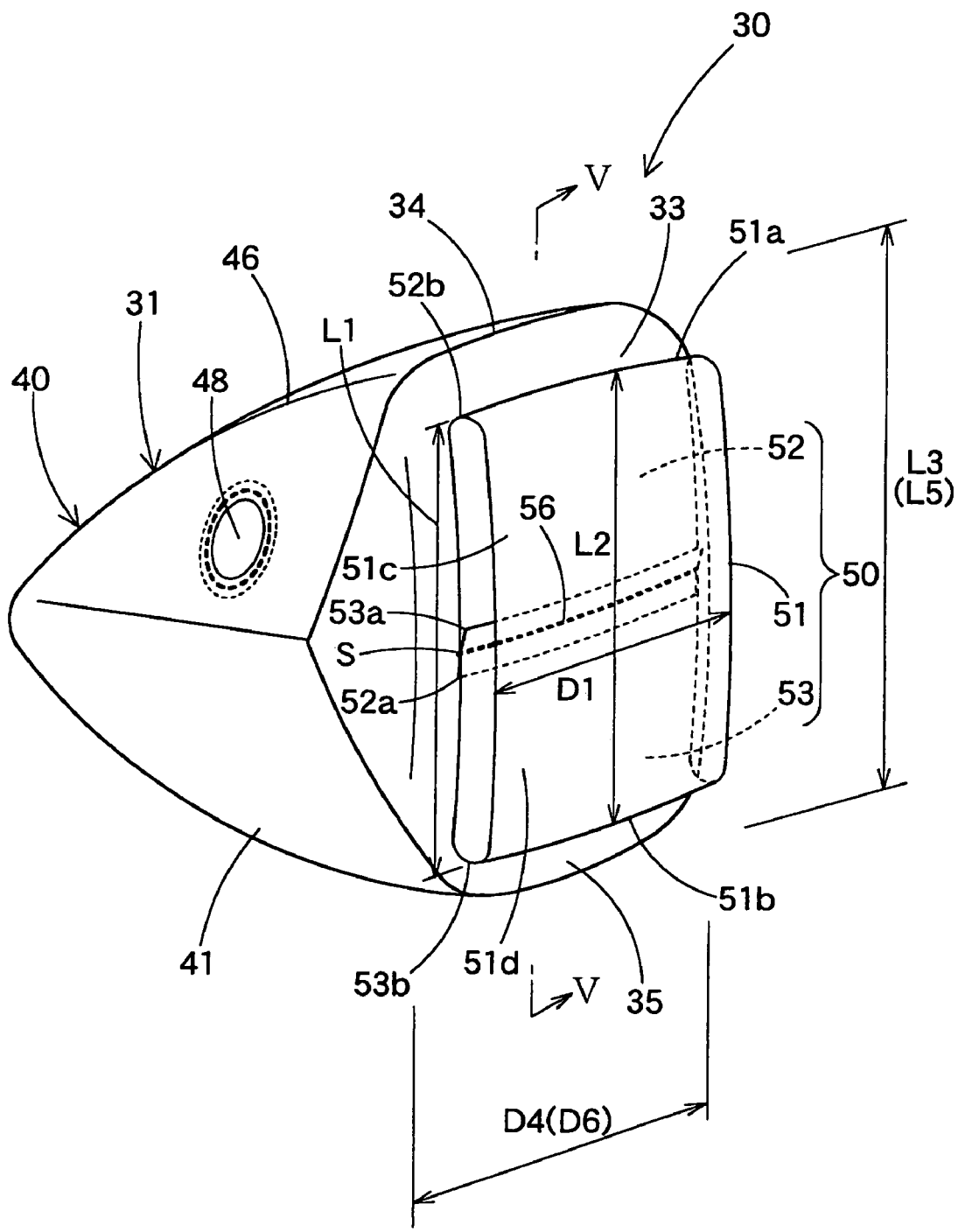
FIG. 4 is a perspective view of a state where an airbag to be used for the first embodiment has been solely inflated, viewed from the rear side of a vehicle.
Figure 5:
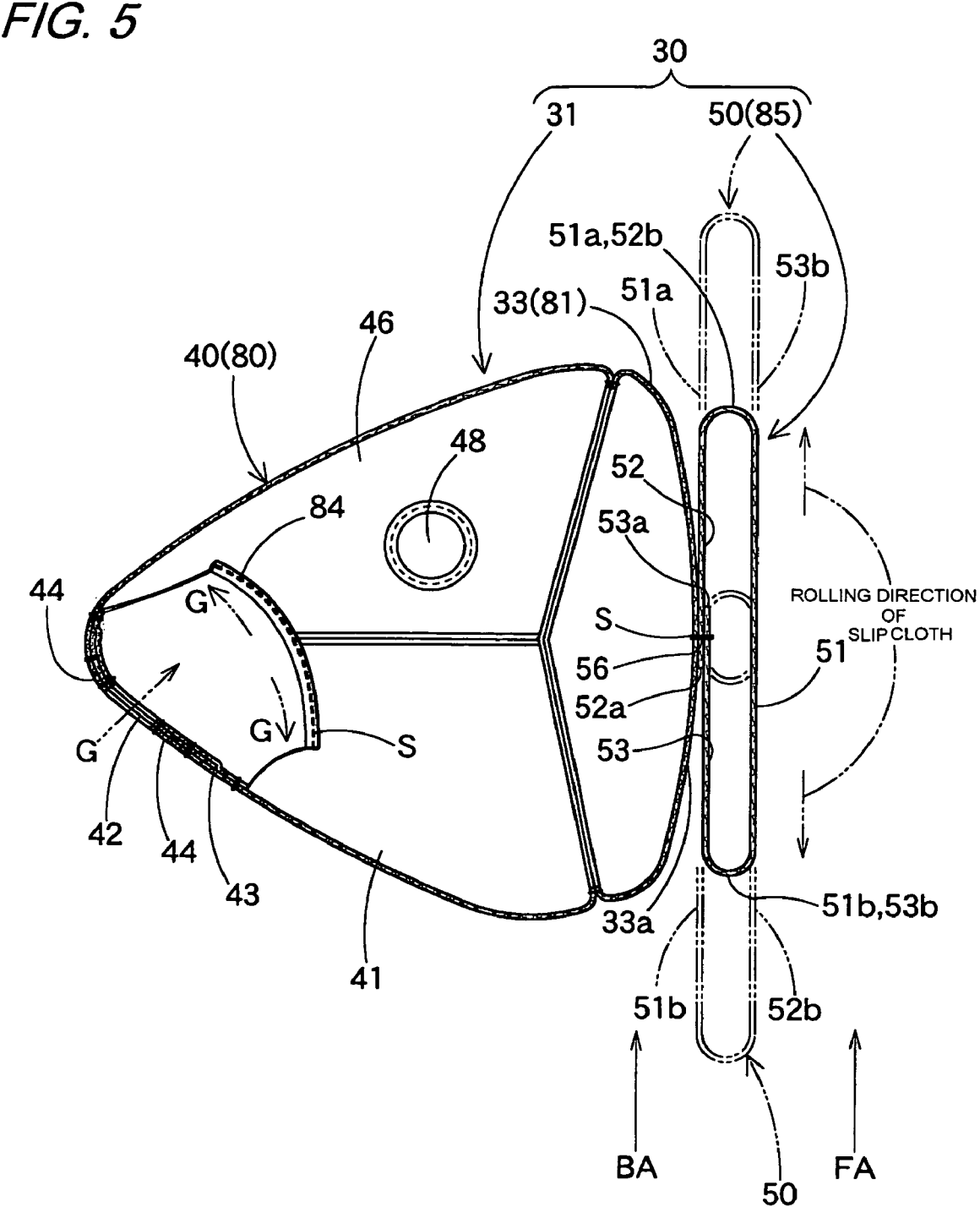
FIG. 5 is a sectional view in the front and rear direction of a vehicle of a state where an airbag to be used for the first embodiment has been solely inflated, which corresponds to a site along V-V of FIG. 4.

The airbag 30, as shown in FIGS. 3 to 5, includes an airbag body 31 and a slip cloth 50 disposed at the outer surface side of the airbag body 31. The airbag body 31 has, as a shape when having completed deploying and inflating, a shape including a passenger-side wall portion 33 arranged at the passenger side along a 30 substantially vertical direction and a peripheral wall portion 40 narrowed into a substantially square pyramidal shape from the outer peripheral edge of the passenger-side wall portion 33 to the front side of the vehicle. At the front part side of a lower part-side peripheral wall 41 to be a lower part side of the peripheral wall portion 40 when deploying and inflating have been completed, a gas inlet port 42 opened in a rectangular shape is provided so as to allow an inflating gas G (see FIG. 5) to flow into the airbag body 31.

Moreover, in the case of the embodiment, disposed inside the airbag body 31 in a manner covering the gas inlet port 42 is a flow control cloth 84 for diverting the flow of inflating gas G flowing into the airbag body 31 to both sides in the front and rear direction.

Moreover, in an opening periphery 43 of the gas inlet port 42, a plurality of attachment holes 44 are penetrated, and through these attachment holes 44, the respective bolts 8a of the retainer 8 are inserted, so that the airbag body 31 (airbag 30) is retained on the bottom wall portion 13 of the case 10. Moreover, in left and right lateral parts of the peripheral wall portion 40, vent holes 48 for discharging surplus inflating gas are provided, respectively. Further, in the vicinity of the attachment holes 44 on the periphery of the gas inlet port 42 at the inner circumferential surface side of the airbag body 31, a substantially square ring-shaped reinforcing cloth 82 woven from polyester yarn, polyamide yarn, or the like is disposed.

Figure 10A:
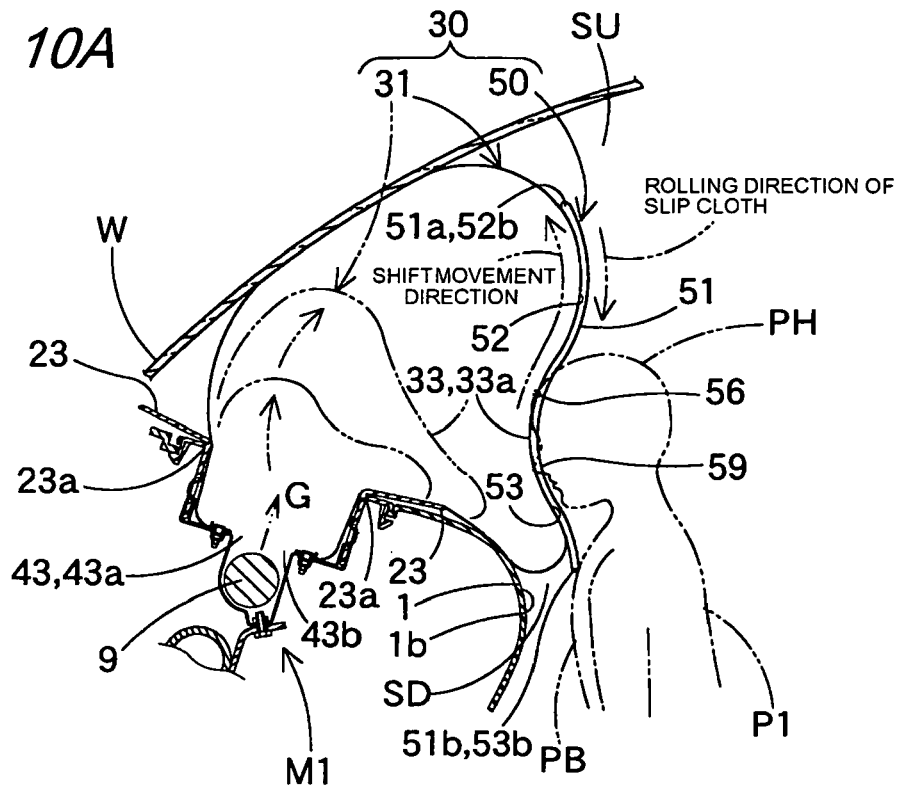
FIGS. 10A and 10B are views explaining the first embodiment when being actuated, which is a state viewed from the vehicle side, and show a case where the passenger is of small build.
Figure 10B:
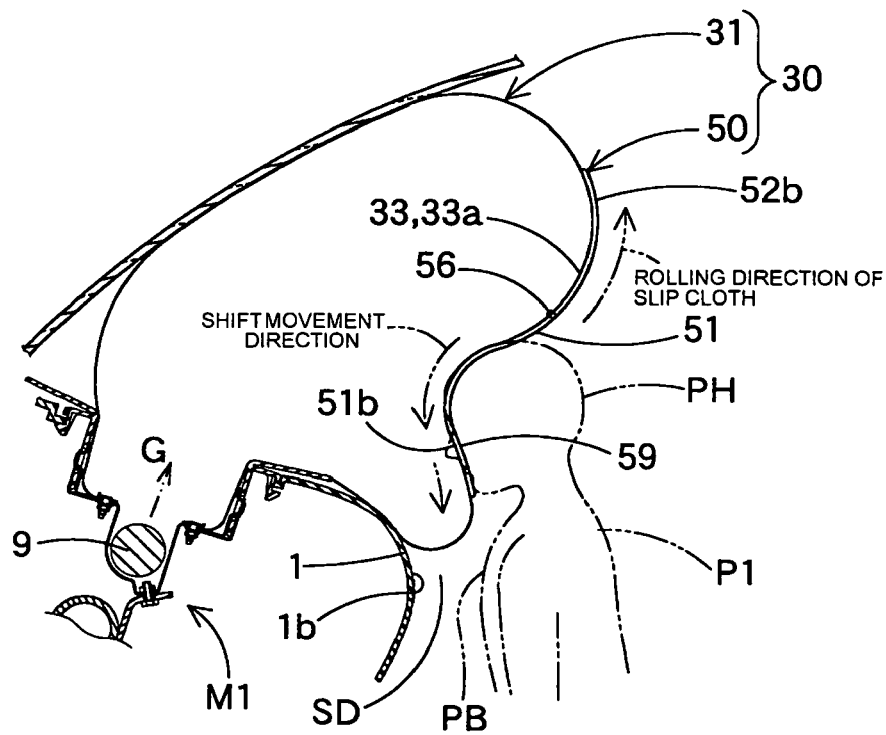

Then, when the airbag body 31 is retained on the case bottom wall portion 13 by the retainer 8, and the case 10 is attached to the body 5, and the airbag system M1 is mounted on the vehicle, the opening face of the gas inlet port 42 is to be arranged, with the side of a front edge 43a of the opening periphery 43 located slightly higher than the side of a rear edge 43b thereof, so as to be along a substantially horizontal direction along with the opening periphery 43 (see FIGS. 10A and 10B).

Figure 6:
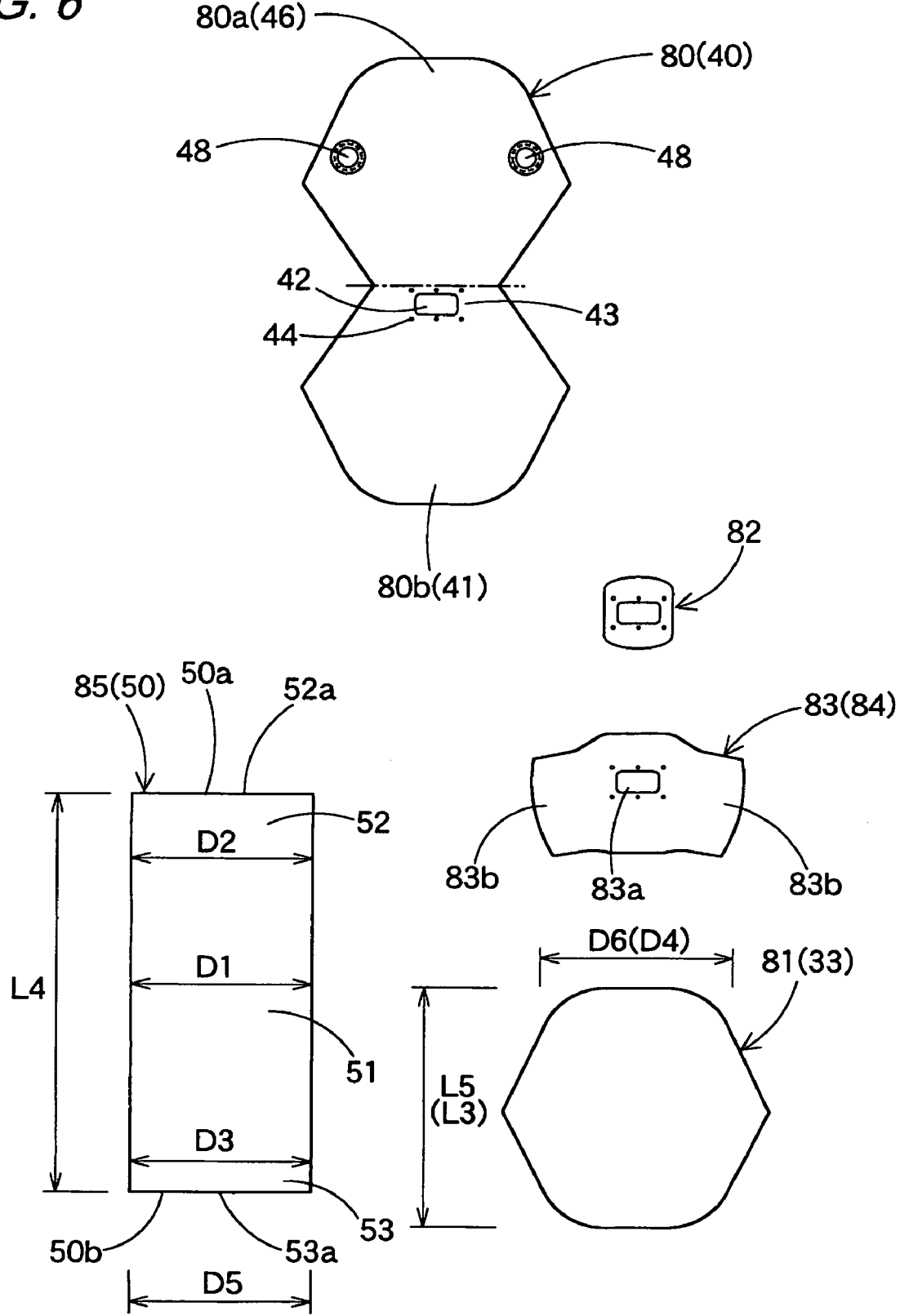
FIG. 6 is a plan view showing members to construct an airbag to be used for the first embodiment.

Further, the airbag body 31 is, as shown in FIG. 6, manufactured by mutually sewing up peripheries of a first base cloth 80 and a second base cloth 81 woven from polyester yarn, polyamide yarn, or the like. The first base cloth 80 is, in the shape that substantially regular hexagonal-shaped two cloth materials (an upper portion 80a and a lower portion 80b) are connected, formed in a gourd shape in which both left and right edges are dented in the vicinities of the center. The second base cloth 81 is formed in a substantially circular shape approximating a substantially regular hexagonal shape. These base cloths 80 and 81 are set so that a three-dimensional airbag body 31 can be manufactured by planar sewing.

Also, the second base cloth 81 is to form substantially the entire area of the passenger-side wall portion 33 of the airbag body 31, and the first base cloth 81 is to form substantially the entire area of the peripheral wall portion 40 of the airbag body 31. The upper portion 80a of the first base cloth 80 is to form substantially the entire area of an upper part-side peripheral wall 46 to be an upper part side of the peripheral wall portion 40, and the lower portion 80b of the first base cloth 80 is to form substantially the entire area of the lower part-side peripheral wall 41 to be a lower part side of the peripheral wall portion 40 (see FIGS. 3 to 5).

The slip cloth 50, which is, in the case of the embodiment, disposed so as to cover the passenger-side wall portion 33 of the airbag body 31 that has completed inflation, is formed, as shown in FIGS. 4 and 5, in a loop shape an axial direction of which is in the left and right direction, with a front panel portion 51 arranged at the passenger side, an upper back panel portion 52 arranged on the passenger-side wall portion 33 at the back side of the front panel portion 51 and extending downward from an upper end 51a of the front panel portion 51, and a lower back panel portion 53 arranged on the passenger-side wall portion 33 at the back side of the front panel portion 51 and extending upward from a lower end 51b of the front panel portion 51.

The front panel portion 51, the upper back panel portion 52, and the lower back panel portion 53 are formed of one substantially rectangular-shaped slip cloth raw material 85 (see FIG. 6) to be described later, where width dimensions D1, D2, and D3 in the left and right direction of the respective panel portions 51, 52, and 53 are made substantially identical from the upper end 50a of the slip cloth 50 to the lower end 50b.

Then, the slip cloth 50 is joined by mutually approximating and overlapping the lower end 52a of the upper back panel portion 52 and the upper end 53a of the lower back panel portion 53 in the vicinity of the center in the upper and lower direction of the back side of the front panel portion 51, attaching this across substantially the entire area in the left and right direction by sewing with a sewing thread S to the vicinity of the center in the upper and lower direction of the passenger-side wall portion 33, and thereby providing a joint portion 56 of a sewing line along the left and right direction.

Figure 8:
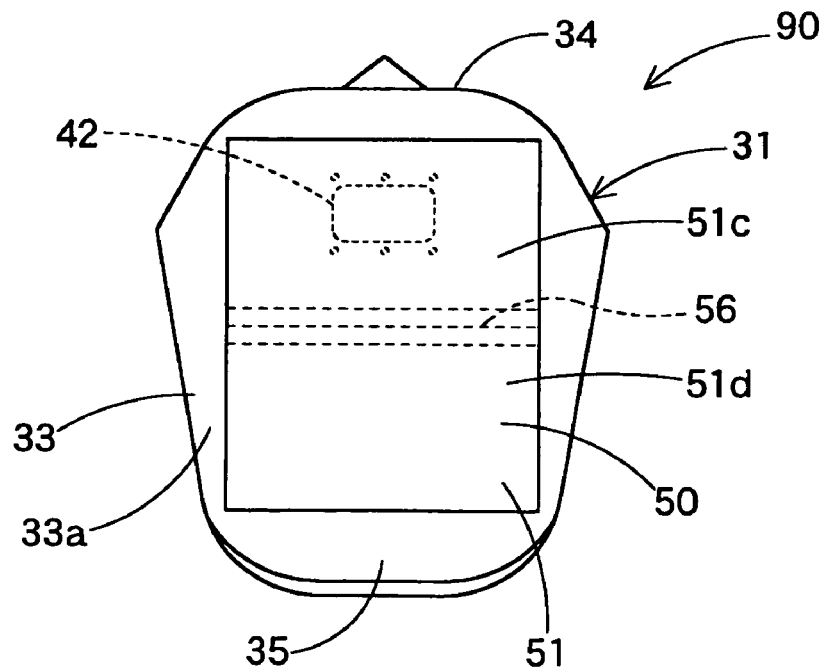
FIG. 8 shows an airbag to be used for the first embodiment that has been preliminarily folded, which is a view from a passenger-side wall portion side.

Also, as shown in FIG. 4 and FIG. 8, the front panel portion 51 is arranged, with the joint portion 56 between the slip cloth 50 and the passenger-side wall portion 33 located at the center in the upper and lower direction, so that an upper portion 51c and a lower portion 51d are substantially equal, and is folded and stored along with the airbag body 31 (see FIG. 2). In a state where the slip cloth 50 is deployed flat in a loop shape, a length dimension L1 in the upper and lower direction from an upper end 52b of the upper back panel portion 52 to a lower end 53b of the lower back panel portion 53 is substantially coincident with a length dimension L2 in the upper and lower direction from the upper end 51a to the lower end 51b of the front panel portion 51 (see FIG. 4).

Moreover, in the embodiment, the length dimension L2 in the upper and lower direction of the front panel portion 51 is set to about 80 percent of a length dimension L3 (see FIG. 4) in the upper and lower direction of the passenger-side wall portion 33. Moreover, a width dimension D1 in the left and right direction of the front panel portion 51 is set to about 80 percent of a width dimension D4 in the left and right direction of the passenger-side wall portion 33. However, the length dimension L2 and the width dimension D1 of the front panel portion 51 may be larger or smaller dimensions than those of the embodiment, as long as these are set to a length dimension and a width dimension that allow the slip cloth 50 to contact the passenger without the passenger-side wall portion 33 contacting the passenger when the airbag system M1 is actuated.

Further, the slip cloth raw material 85 to form the slip cloth 50 is, as shown in FIG. 6, made of a woven fabric woven from polyester yarn, polyamide yarn, or the like. The slip cloth raw material 85 is set in its length dimension L4 in the upper and lower direction to be larger than (in the embodiment, to about twice) a length dimension L5 in the upper and lower direction of the second base cloth 81 that forms the passenger-side wall portion 33 of the airbag body 31. Moreover, the slip cloth raw material 85 is set in its width dimension D5 in the left and right direction to be about 80 percent of a width dimension D6 in the left and right direction in the vicinity of the upper edge of the second base cloth 81. Incidentally, the width dimension D6 in the left and right direction in the vicinity of the upper edge of the second base cloth 81 is substantially coincident with the width dimension D4 (see FIG. 4) in the left and right direction of the passenger-side wall portion 33.

The flow control cloth 84 is, as shown in FIGS. 3 and 5, in the shape larger than the front and rear and left and right dimensions of the gas inlet port 42 so as to be able to cover the gas inlet port 42 within the airbag body 31, and has, at the time of deploying and inflating of the airbag body 31, a sectional shape in the front and rear direction opposing the vicinity of the center of the gas inlet port 42 in an arc-like curve form swelling in the upper direction to separate from the gas inlet port 42.

In the case of the embodiment, the flow control cloth 84 is, as shown in FIG. 6, in a state before being attached to the airbag body 31, provided as a flow control cloth raw material 83 woven from polyester yarn, polyamide yarn, or the like.

The flow control cloth raw material 83 includes an opening 83a corresponding to the gas inlet port 42 as well as belt portions 83b and 83b extending from both sides in the vehicle left and right direction of the opening 83a, and by mutually sewing up tips of the belt portions 83b and 83b, the flow control cloth 84 is formed. In the flow control cloth raw material 83, holes (reference numeral and sign are omitted in the figure) corresponding to the attachment holes 44 are also disposed.

Next, manufacturing of the airbag 30 will be described. First, to manufacture the airbag body 31, the opening periphery 43 of the gas inlet port 42 to be at the inner circumferential surface side of the airbag body 31 in the first base cloth 80 is, by use of a sewing thread S, sewn up with the reinforcing cloth 82 and the flow control cloth raw material 83, the left and right belt portions 83b and 83b of the flow control cloth raw material 83 are mutually sewn up to form the flow control cloth 84 in a predetermined shape. Then, the first base cloth 80 is folded between the upper portion 80a and the lower portion 80b, both left and right edges in the vicinity of the overlapped opening 83a are mutually sewn up, and non-sewn parts are opened so as to separate from each other. Then, by sewing up the outer periphery thereof and the outer periphery of the second base cloth 81 to which the slip cloth 50 has been in advance attached by sewing, the airbag body 31 can be formed in a bag shape. Prior to manufacturing of the airbag body 31, the slip cloth 50 made from the slip cloth raw material 85 deployed in a plane into a loop shape where the upper end 50a and the lower end 50b are mutually approximated is attached by sewing with a sewing thread S to the outer surface side, to be at the passenger side at the time of deploying and inflating, of the second base cloth 81, with both end portions 50a, 50b mutually overlapped. Then, after the airbag body 31 is formed in a bag shape, the airbag body 31 is turned inside out by use of the gas inlet port 42 so that margins after sewing up the respective parts are not exposed to the outer surface side of the airbag body 31, whereby the airbag 30 can be formed.

To describe mounting on the vehicle of the airbag 30 manufactured as in the above, first, the airbag 30 is folded up in a state where the retainer 8 is disposed inside so as to make the bolt 8a project from each attachment hole 44, and further the folded airbag 30 is wrapped with a rupturable wrapping sheet (not shown) so as not to loose the folded shape.

Then, the airbag 30 is folded up through, as folding such as to crease along the left and right direction, a horizontal folding step of narrowing the length dimension in the front and rear direction, and as folding such as to crease along the front and rear direction, a vertical folding step of narrowing the width dimension in the left and right direction, following a preliminary folding step.

Figure 7:
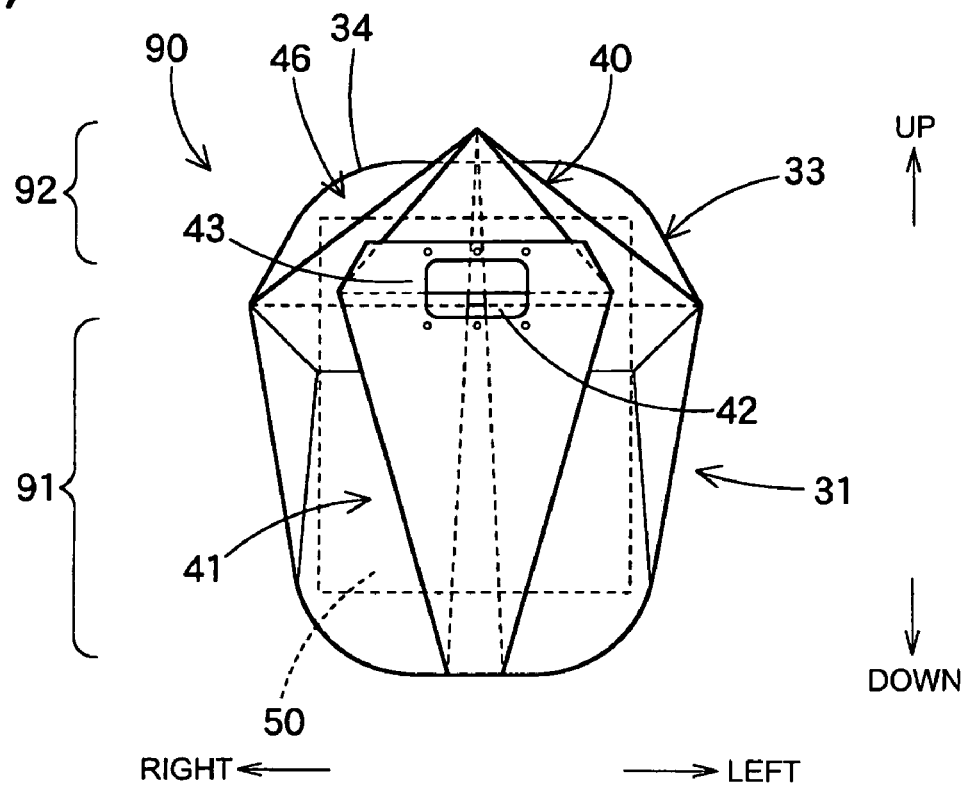
FIG. 7 shows an airbag to be used for the first embodiment that has been preliminarily folded, which is a view from a gas inlet port side.

In the preliminary folding step, a preliminarily folded airbag 90 as shown in FIGS. 7 and 8 is to be formed. In the preliminary folding, there provided is a shape where the passenger-side wall portion 33 is overlapped with the lower part-side peripheral wall 41 of the peripheral wall portion 40 and flattened, with the vicinity of an upper edge 34 in the passenger-side wall portion 33 arranged at a position above the gas inlet port 42 so as to oppose the gas inlet port 42 in the upper and lower direction. Further, in the case of the embodiment, the peripheral wall portion 40 side is folded up for preliminary folding so that substantially the entire area of the passenger-side wall portion 33 is deployed flat. Here, the slip cloth 50 is coordinated so that the joint portion 56 is located at the center in the upper and lower direction of the back side of the front panel portion 51, and arranged so as to cover a surface 33a of the passenger-side wall portion 33 of the airbag body 31.

Figure 9A:
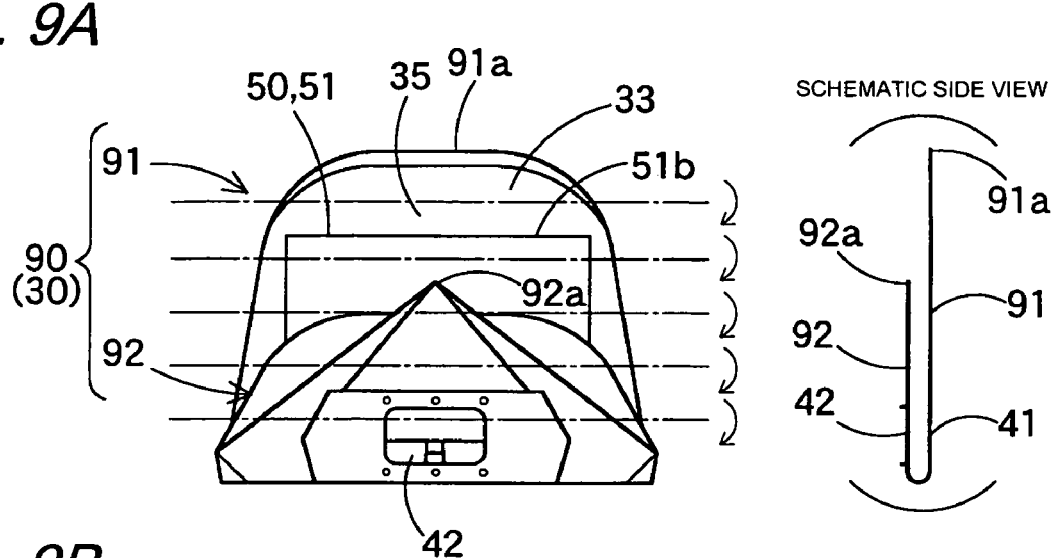
FIGS. 9A to 9D are views showing folding steps after preliminary folding of an airbag to be used for the first embodiment.
Figure 9B:
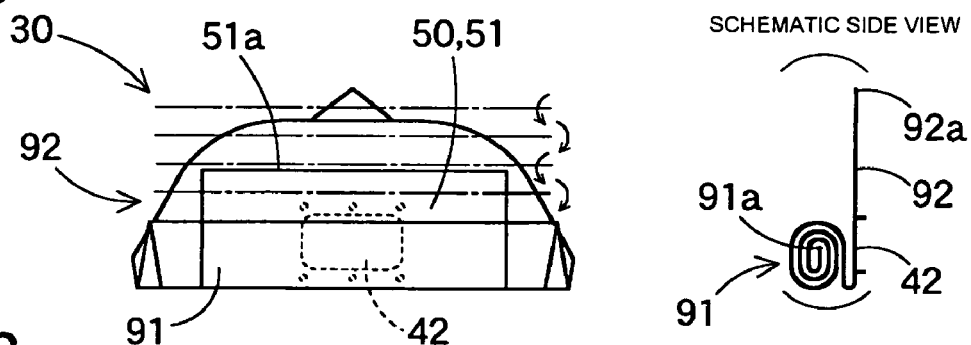

Then, after such preliminary folding, as shown in FIGS. 9A and 9B, a rear side part 91 and a front side part 92 of the gas inlet port 42 in the preliminarily folded airbag 90 are creased along the left and right direction, and horizontal folding is performed so as to approximate end portions 91a and 92a to the gas inlet port 42. In the case of the embodiment, the rear side part 91 takes roll folding where the rear end 91a is rolled so as to come close to the lower part-side peripheral wall 41 (to the instrument panel 1), and placed on the passenger-side wall portion 33. Moreover, the front side portion 92 takes accordion folding. At this time, for the slip cloth 50, the lower end 51b side of the front panel portion 51 is rolled, along with the rear end 91a of the rear side part 91 to serve as a lower edge-vicinity part 35 in the passenger-side wall portion 33 of the airbag body 31, so as to come close to the lower part-side peripheral wall 41, and roll-folded along with the airbag body 31, and the upper end 51a of the front panel portion 51 is accordion-folded along with the front side part 92.

Figure 9C:
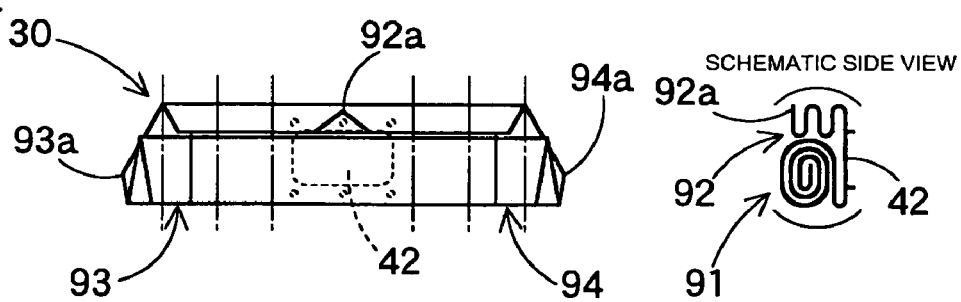
Figure 9D:
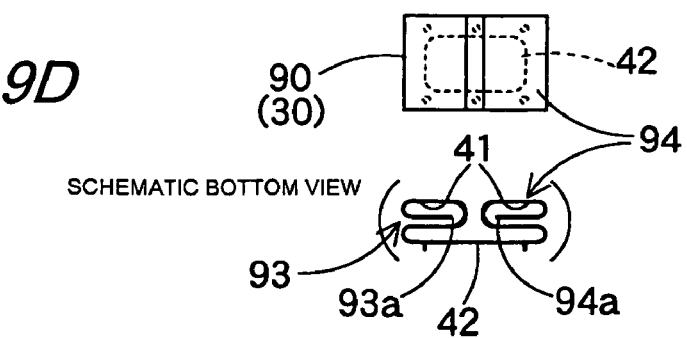

After horizontal folding is performed, as shown in FIGS. 9C and 9D, a left side part 93 and a right side part 94 of the gas inlet port 42 in the airbag 30 after the horizontal folding step are creased along the front and rear direction, and vertical folding is performed so as to approximate end portions 93a and 94a to the gas inlet port 42. In the case of the embodiment, the left side part 93 and the right side part 94 take accordion folding where the end portion 93a, 94a-side is folded back so as to come close to the lower part-side peripheral wall 41, and then placed on the passenger-side wall portion 33.

When folding of the airbag 30 is completed through the vertical folding step, the folded airbag 30 is wrapped with a rupturable wrapping sheet (not shown) so as not to loose the folded shape.

Then, the inflator 9 is stored in the lower chamber 15 of the case 10, the folded airbag 30 is stored in the upper chamber 11 so as to make each bolt 8a of the retainer 8 project from each bottom wall portion 13 of the case 10, and further, from above, the side wall portion 25 of the airbag cover 21 is externally fitted to the upper chamber 11 to insert the locking protrusion 12a of the peripheral wall portion 12 in each locking hole 25a of the side wall portion 25.

Next, the upper end of each vertical plate portion 19b is inserted through the locking protrusion 12a projecting from the side wall portion 25, the bolt 8a is inserted through each horizontal plate portion 19a to arrange the presser plates 19 and 19 in the front and rear parts of the case 10, and further, the nut 8b is screwed with each bolt 8a, whereby the airbag system M1 can be assembled.

Then, the airbag system M1 thus assembled can be mounted on the vehicle by inserting this from the opening 2 of the instrument panel 1 having been assembled to the vehicle, locking each locking leg 22a of the airbag cover 21 to the flange portion 3, and screwing the bolt 6 with the nut 17a through the bracket 5b to connect the case 10 to the body 5.

After the airbag system M1 is mounted on the vehicle, if the inflating gas G is ejected from the inflator 9, the airbag 30 deploys and inflates while eliminating the creases resulting from the horizontal folding or vertical folding to fracture the wrapping sheet (not shown) and fractures the to-be-fractured portion 24 of the airbag cover 21 to make the flap portions 23, 23 open as shown by the alternate long and two short dashed lines of FIG. 2 and in FIGS. 10A, 10B, 12A and 12B, and thereby greatly projects from the case's upper chamber 11 through the opening 2 of the instrument panel 1. At this time, the slip cloth 50 of the airbag 30 deploys, at the rear face side of the passenger-side wall portion 33 of the airbag body 31, with substantially the entire area of the front panel portion 51 opposing the passenger P1, P2.

Therefore, in the airbag system M1, as shown in FIG. 10A, when there is a passenger P1 of small build being in proximity to the instrument panel 1, the passenger-side wall portion 33 of the airbag body 31 does not directly contact the passenger P1, but a lower side of the front panel portion 51 of the slip cloth 50 contacts the passenger P1, and the airbag body 31 inflates toward a large space SU at an upper side of a head PH of the passenger P1 so as to eliminate the folding of the part at the upper side (upper part-side peripheral wall 46 of the peripheral wall portion 40 and the like). More specifically, the passenger-side wall portion 33 of the airbag body 31, as a result of the deploying and inflating of the airbag 30, attempts to shift and move upward with respect to the passenger P1.

In this case, as shown in FIGS. 10A and 10B, a contact portion 59 being in contact with the passenger P1 in the front panel portion 51 is integrated by frictional resistance or the like with the passenger P1 and does not move, and the upper back panel portion 52 and the lower back panel portion 53 at the back side of the contact portion 59 shift to move upward with respect to the front panel portion 51.

In other words, when the passenger-side wall portion 33 attempts to shift and move upward with respect to the passenger P1, the slip cloth 50 moves the joint portion 56 of the upper back panel portion 52 and the lower back panel portion 53 to the passenger-side wall portion 33 upward along with the passenger-side wall portion 33 and shifts and moves the joint portion 56 with respect to the contact portion 59 of the front panel portion 51 with the passenger P1. More specifically, the slip cloth 50 rolls on the surface 33a of the passenger-side wall portion 33 so as to make the initial lower end 51b side of the front panel portion 51 enter an area BA (see FIG. 5) of the initial lower back panel portion 53 at the back side and make the initial upper end 52b side of the upper back panel portion 52 enter an area FA (see FIG. 5) of the initial front panel portion 51 at the front side.

Figure 11A:
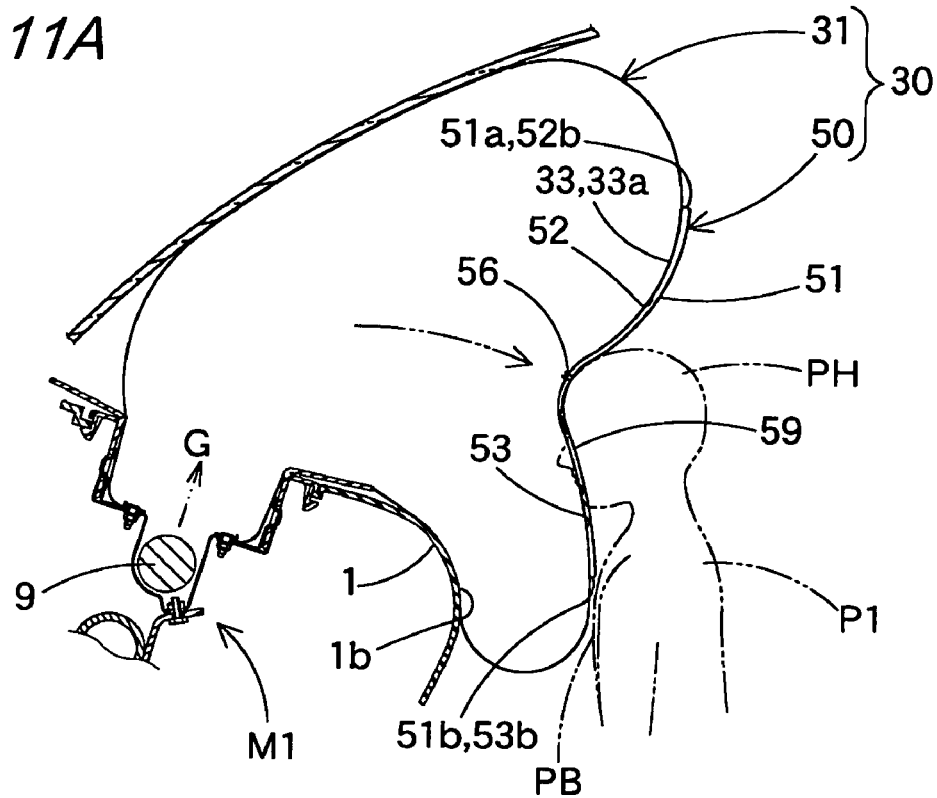
FIGS. 11A and 11B are views explaining the first embodiment when being actuated, which is a state viewed from the vehicle side, and show a state after FIG. 10.

Thereafter, as shown in FIGS. 10B and 11A, the airbag body 31 inflates toward a space SD between a breast PB of the passenger P1 and a rear face 1b of the instrument panel 1 so as to eliminate the folding of the part at the lower side (lower part-side peripheral wall 41 of the peripheral wall portion 40 and the lower edge-vicinity part 35 side of the passenger-side wall portion 33).

At this time, because the passenger-side wall portion 33 attempts to shift and move downward with respect to the passenger P1 as a result of the deploying and inflating of the airbag 30, the slip cloth 50 conversely moves the joint portion 56 downward along with the passenger-side wall portion 33 and shifts and moves the joint portion 56 with respect to the contact portion 59. More specifically, the slip cloth 50 rolls on the surface 33a of the passenger-side wall portion 33 so as to move and make the upper end 52b side of the upper back panel portion 52 that has entered the area FA of the initial front panel portion 51 at the front side return to the area BA of the initial upper back panel portion 52 at the back side and move and make the lower end 51b side of the front panel portion 51 that has entered the area BA of the initial lower back panel portion 53 at the back side return to the area FA of the initial front panel portion 51 at the front side.

Figure 11B:
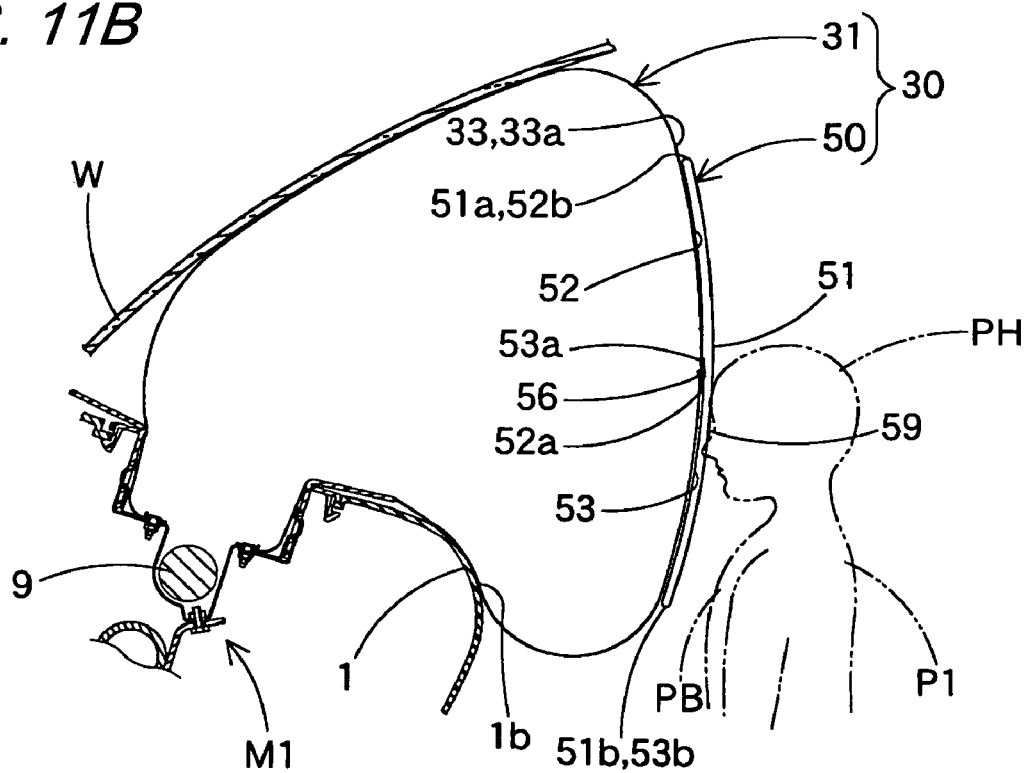

Then, as shown in FIGS. 11A and 11B, the airbag body 31 smoothly completes inflation so as to enter between the instrument panel 1 and the passenger P1, and thereby arranges the passenger-side wall portion 33 at the front side of the passenger P1. Therefore, the passenger P1 of small build, even if he/she hits at a position biased downward with respect to the passenger-side wall portion 33 via the slip cloth 50 at the initial time of inflation of the airbag 30, is received with excellent cushioning characteristics by the passenger-side wall portion 33 of the airbag body 31 that has completed inflation, and is thus satisfactorily protected.

Figure 12A:
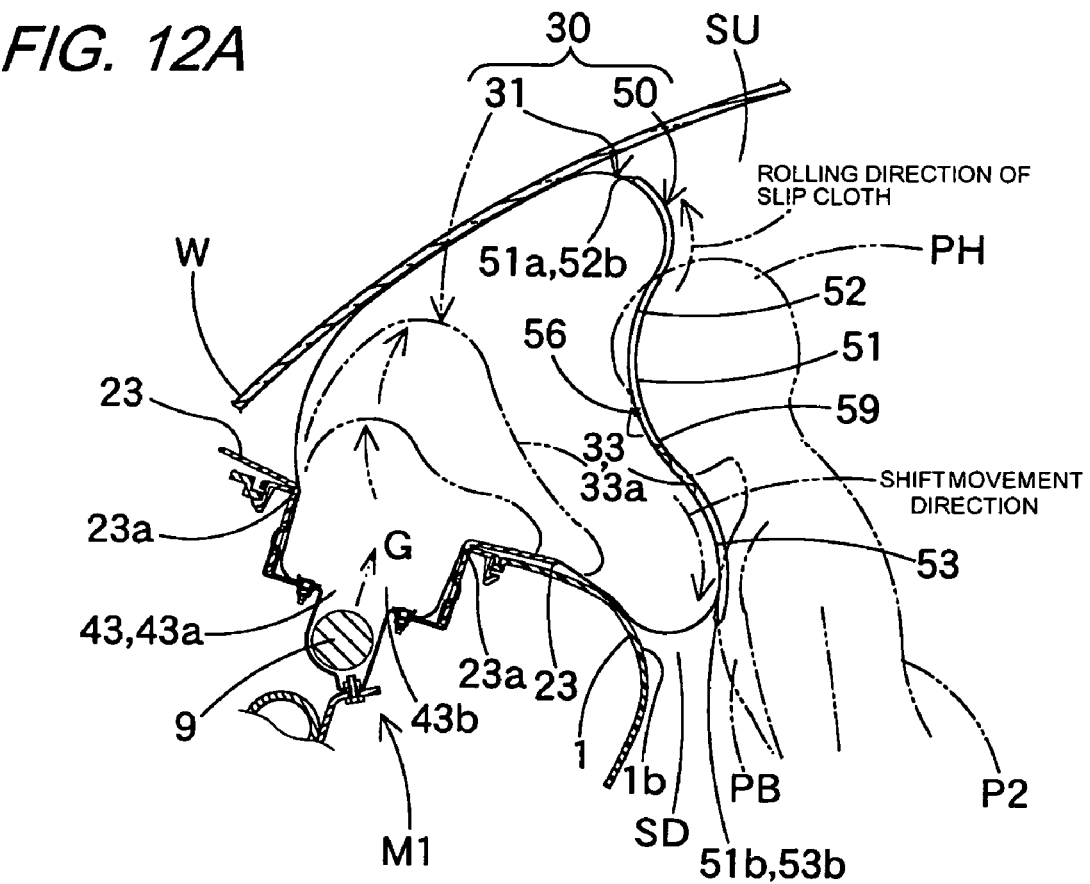
FIGS. 12A and 12B are views explaining the first embodiment when being actuated, which is a state viewed from the vehicle side, and show a case where the passenger is of large build.

Moreover, in the airbag system M1, as shown in FIG. 12A, when there is a passenger P2 of large build being in proximity to the instrument panel 1, the passenger-side wall portion 33 of the airbag body 31 does not directly contact the passenger P2, but the upper side of the front panel portion 51 of the slip cloth 50 contacts the passenger P2, and the airbag body 31 inflates toward a space SD between a breast PB of the passenger P2 and the rear face 1b of the instrument panel 1 so as to eliminate the folding of the part at the lower side (lower part-side peripheral wall 41 of the peripheral wall portion 40 and the lower edge-vicinity part 35 side of the passenger-side wall portion 33). More specifically, the passenger-side wall portion 33 of the airbag body 31, as a result of the deploying and inflating of the airbag 30, attempts to shift and move downward with respect to the passenger P2.

Figure 12B:
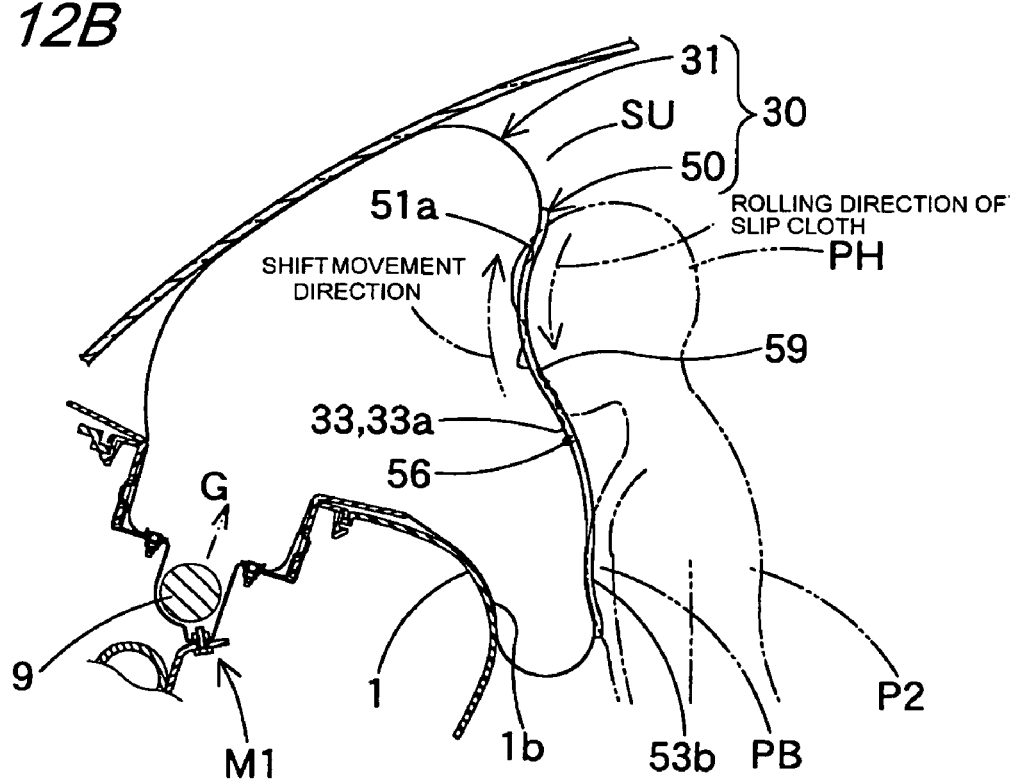

In this case, as shown in FIGS. 12A and 12B, a contact portion 59 being in contact with the passenger P2 in the front panel portion 51 is integrated by frictional resistance or the like with the passenger P2 and does not move, and the upper back panel portion 52 and the lower back panel portion 53 at the back side of the contact portion 59 shift to move downward with respect to the front panel portion 51.

In other words, when the passenger-side wall portion 33 attempts to shift and move downward with respect to the passenger P2, the slip cloth 50 moves the joint portion 56 downward along with the passenger-side wall portion 33 and shifts and moves the joint portion 56 with respect to the contact portion 59. More specifically, the slip cloth 50 rolls on the surface 33a of the passenger-side wall portion 33 so as to make the initial upper end 51a of the front panel portion 51 enter the area BA (see FIG. 5) of the initial upper back panel portion 52 at the back side and make the initial lower end 53b side of the lower back panel portion 53 enter the area FA (see FIG. 5) of the initial front panel portion 51 at the front side.

Figure 13A:
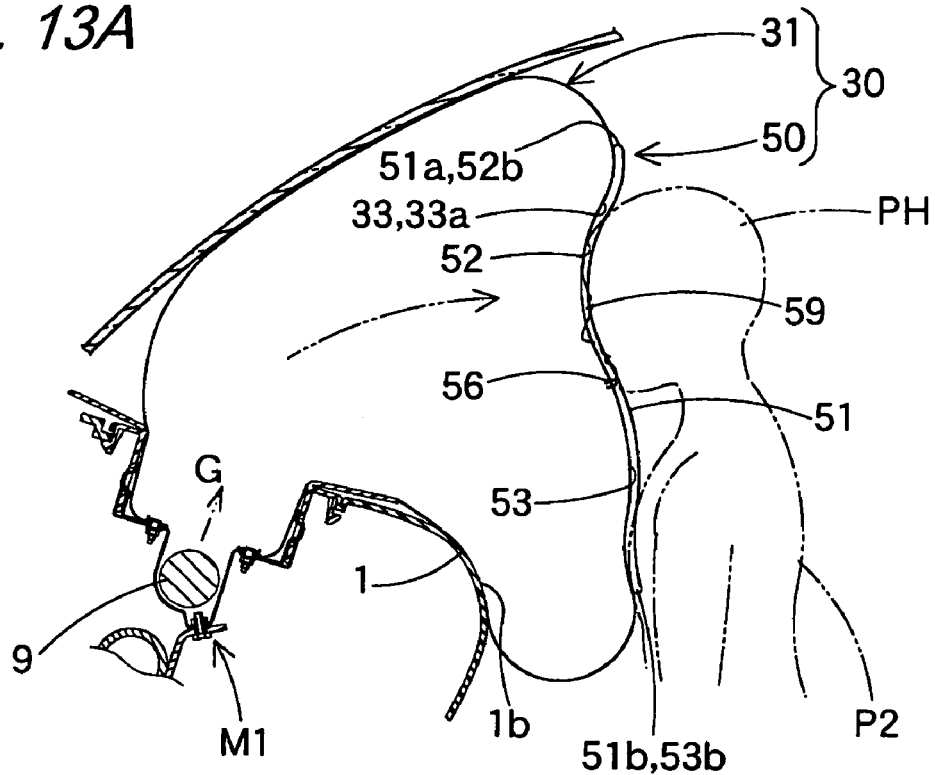
FIGS. 13A and 13B are views explaining the first embodiment when being actuated, which is a state viewed from the vehicle side, and show a state after FIGS. 12A and 12B.

Thereafter, as shown in FIGS. 12B and 13A, the airbag body 31 inflates toward the space SU at an upper side of a head PH of the passenger P2 so as to eliminate the folding of the part at the upper side (upper part-side peripheral wall 46 of the peripheral wall portion 40 and the like).

At this time, because the passenger-side wall portion 33 attempts to shift and move upward with respect to the passenger P2 as a result of the deploying and inflating of the airbag 30, the slip cloth 50 conversely moves the joint portion 56 upward along with the passenger-side wall portion 33 and shifts and moves the joint portion 56 with respect to the contact portion 59. More specifically, the slip cloth 50 rolls on the surface 33a of the passenger-side wall portion 33 so as to move and make the lower end 53b side of the lower back panel portion 53 that has entered the area FA of the initial front panel portion 51 at the front side return to the area BA of the initial lower back panel portion 53 at the back side and move and make the upper end 51a of the front panel portion 51 that has entered the area BA of the initial upper back panel portion 52 at the back side return to the area FA of the initial front panel portion 51 at the front side.

Figure 13B:
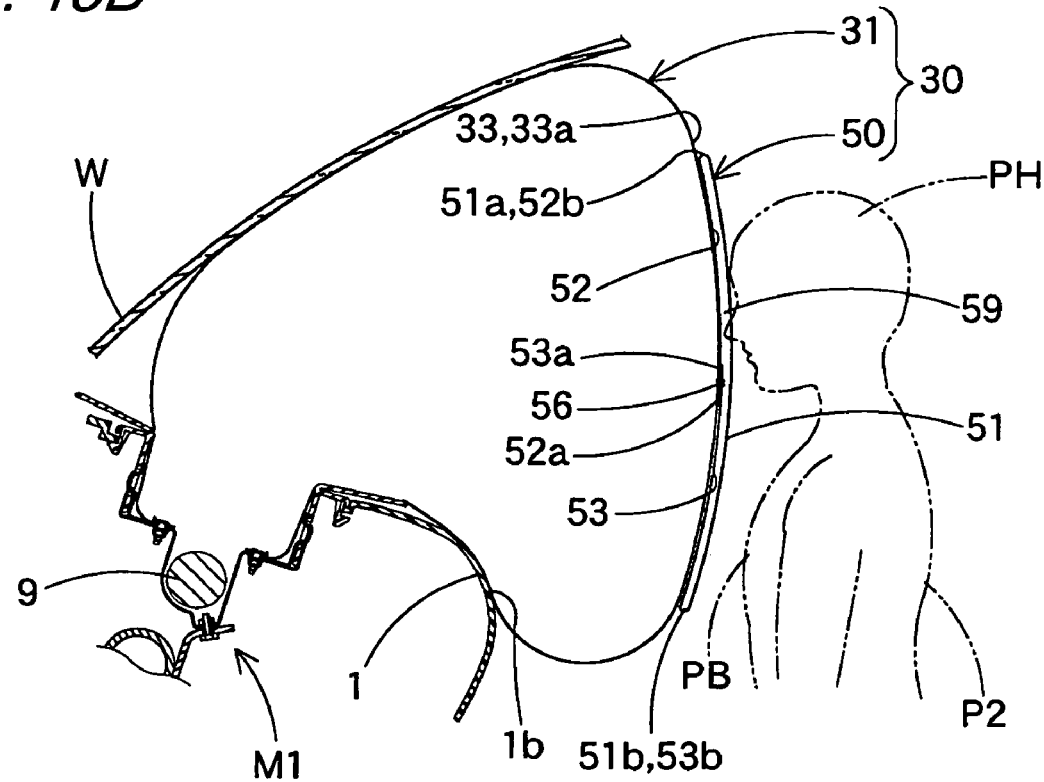
Figure 14:
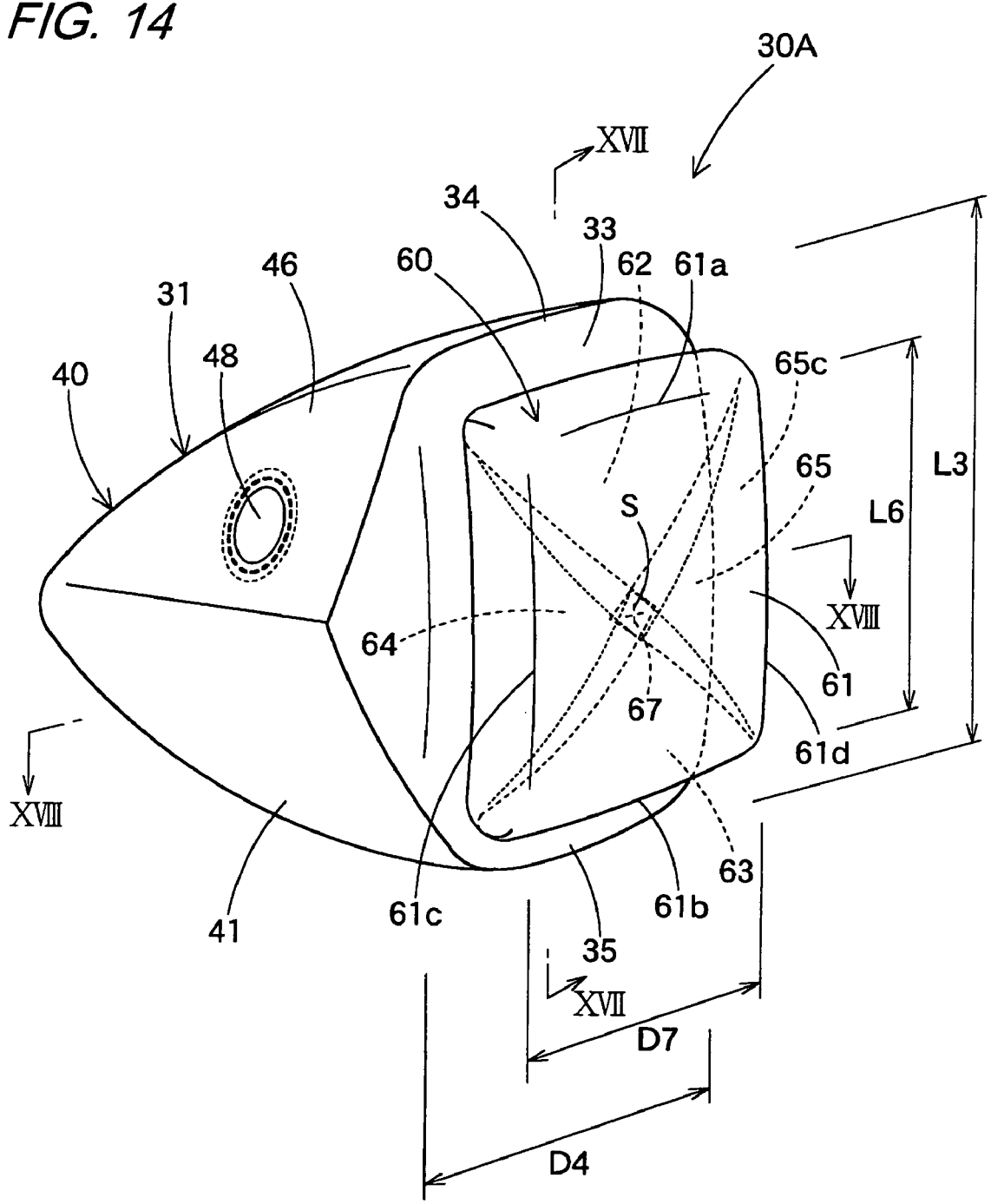
FIG. 14 is a perspective view of a state where an airbag, which is the second embodiment of the present invention, has been solely inflated.

Then, as shown in FIGS. 13A and 13B, the airbag body 31 smoothly completes inflation so as to enter between the instrument panel 1 and the passenger P2, and thereby arranges the passenger-side wall portion 33 at the front side of the passenger P2. Therefore, the passenger P2 of large build, even if he/she hits at a position biased upward with respect to the passenger-side wall portion 33 via the slip cloth 50 at the initial time of inflation of the airbag 30, is received with excellent cushioning characteristics by the passenger-side wall portion 33 of the airbag body 31 that has completed inflation, and is thus satisfactorily protected.

Also, in the airbag system M1, because the distance by which the slip cloth 50 can roll on the surface 33a of the passenger-side wall portion 33 equals a distance until the joint portion 56 of the upper back panel portion 52 and the lower back panel portion 53 to the passenger-side wall portion 33 is arranged from the uppermost end position to the lowermost end position of the loop-shaped slip cloth 50 (see FIG. 5), the slip cloth 50 can roll a distance of about ½ of the perimeter between the passenger-side wall portion 33 and the passenger. Therefore, in the airbag system M1, the distance of shift movement in the upper and lower direction of the passenger-side wall portion 33 with respect to the passenger can be easily secured large in proportion to increasing the perimeter of the slip cloth 50.

As has been described above, in the airbag system M1 of the first embodiment, a shift movement of the airbag body 31 in both upper and lower directions with respect to the passenger P1, P2 is enabled, and the distance of the shift movement can be easily secured large, so that the effect of suppressing a load of the airbag 30 on the passenger P1, P2 can be improved.

Further, in the airbag system M1 of the first embodiment, for the slip cloth 50, the width dimensions D1, D2, and D3 in the left and right direction of the front panel portion 51 and the upper and lower back panel portions 52 and 53 are made substantially identical across the circumferential direction, and the upper and lower back panel portions 52 and 53 are joined to the passenger-side wall portion 33 across substantially the entire area in the left and right direction, and thus when folding up the airbag 30 in assembly of the airbag system M1, assembling work can be easily performed without the slip cloth 50 shifting in the left and right direction with respect to the passenger-side wall portion 33.

Also, if the above-mentioned point is not taken into consideration, the slip cloth 50 may be a tapered slip cloth where the width dimension D2 in the left and right direction of the lower end 52a of the upper back panel portion 52 and the width dimension D3 in the left and right direction of the upper end 53a of the lower back panel portion 53 are narrower than the width dimension D1 in the left and right direction of the front panel portion 51, in a state deployed in a plane.

Moreover, in the airbag system M1 of the first embodiment, the slip cloth 50 has been attached by sewing to be joined to the passenger-side wall portion 33 across substantially the entire area in the left and right direction, however, the slip cloth 50 may be joined in a partial area (for example, attaching by sewing in a dotted manner or the like) without joining substantially the entire area in the left and right direction of the slip cloth 50.

Moreover, in the airbag system M1 of the first embodiment, for the slip cloth 50, the lower end 52a of the upper back panel portion 52 and the upper end 53a of the lower back panel portion 53 have been attached by sewing while mutually approximated and overlapped in the vicinity of the center in the upper and lower direction of the back side of the front panel portion 51, however, so long as not obstructing the area where the slip cloth 50 rolls on the passenger-side wall portion 33, in a mutually approximated state of the lower end 52a of the upper back panel portion 52 and the upper end 53a of the lower back panel portion 53 without being overlapped, the respective end portion 52a, 53a sides may be separately attached by sewing to be joined to the passenger-side wall portion 33.

Moreover, in the airbag system M1 of the first embodiment, for the slip cloth 50, the lower end 52a of the upper back panel portion 52 and the upper end 53a of the lower back panel portion 53 and the vicinity of the center in the upper and lower direction of the passenger-side wall portion 33 are overlapped and attached by sewing all together in consideration of efficiency of manufacturing man-hours of the airbag 30, however, if this point is not taken into consideration, the lower end 52a of the upper back panel portion 52 and the upper end 53a of the lower back panel portion 53 may be sewn up in advance, and then the slip cloth 50 may be sewn up to be joined with the passenger-side wall portion 33 at an arbitrary position in the circumferential direction. In this case, because it is preferable that the joint portion of both end portion 52a, 53a sides does not contact the passenger, the slip cloth is desirably disposed so that the joint portion is not arranged at the front panel portion side to be the passenger side.

In the airbag system M1 of the first embodiment having been described in the foregoing, for the slip cloth 50, the substantially rectangular-shaped slip cloth raw material 85 has been formed in a loop shape an axial direction of which is in the left and right direction, and substantially the entire area in the left and right direction has been linearly attached by sewing to the passenger-side wall portion 33, however, as in a second embodiment shown in FIG. 14 to FIG. 20B, a slip cloth 60 may further include a loop an axial direction of which is in the upper and lower direction, besides the loop the axial direction of which is in the left and right direction.

An airbag system M2 (see FIGS. 19A and 19B) of the second embodiment shown in FIG. 14 to FIG. 20B, the slip cloth 60 further includes, besides a front panel portion 61, an upper back panel portion 62, and a lower back panel portion 63, a left back panel portion 64 arranged on the passenger-side wall portion 33 at the back side of the front panel portion 61 and extending rightward from a left end 61c of the front panel portion 61 and a right back panel portion 65 arranged on the passenger-side wall portion 33 at the back side of the front panel portion 61 and extending leftward from a right end 61d of the front panel portion 61.

Figure 15:
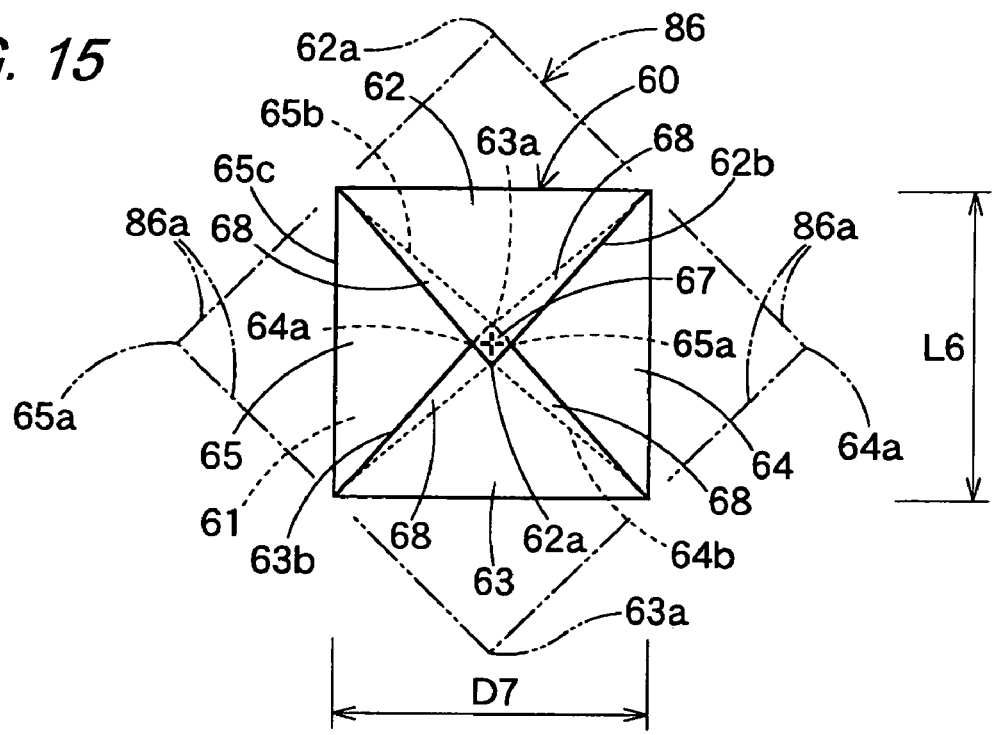
FIG. 15 is a plan view showing members to construct a slip cloth to be used for the second embodiment.

The front panel portion 61 and the respective back panel portions 62, 63, 64, and 65 are, as shown by alternate long and two short dashed lines in FIG. 15, formed of one substantially regular square-shaped slip cloth raw material 86 in such a manner as to have diagonal lines along the upper and lower direction and the left and right direction of the slip cloth 60. Also, in the second embodiment, respective sides 86a of the slip cloth raw material 86 are formed with identical length dimensions to each other.

Then, the slip cloth 60 is, as shown in FIGS. 14, 15, 17, and 18, joined by mutually approximating and overlapping a right end 64a of the left back panel portion 64 and a left end 65a of the right back panel portion 65, along with a lower end 62a of the upper back panel portion 62 and an upper end 63a of the lower back panel portion 63, in the vicinity of the center of the back side of the front panel portion 61 and attaching this by sewing with a sewing thread S to the passenger-side wall portion 33. Also, in the second embodiment, a central portion 67 where the respective back panel portions 62, 63, 64, and 65 are overlapped is joined in a dotted manner to the vicinity of the center in the upper and lower and left and right directions of the passenger-side wall portion 33.

Moreover, in the second embodiment, a length dimension L6 in the upper and lower direction of the front panel portion 61 is set to about 80 percent of a length dimension L3 in the upper and lower direction of the passenger-side wall portion 33. Moreover, a width dimension D7 in the left and right direction of the front panel portion 61 is set to about 80 percent of a width dimension D4 in the left and right direction of the passenger-side wall portion 33. However, the length dimension L6 and the width dimension D7 of the front panel portion 61 may be larger or smaller dimensions than those of the embodiment, as long as these are set to a length dimension and a width dimension that allow the slip cloth 60 to contact the passenger without the passenger-side wall portion 33 contacting the passenger when the airbag system M2 is actuated.

Figure 16:
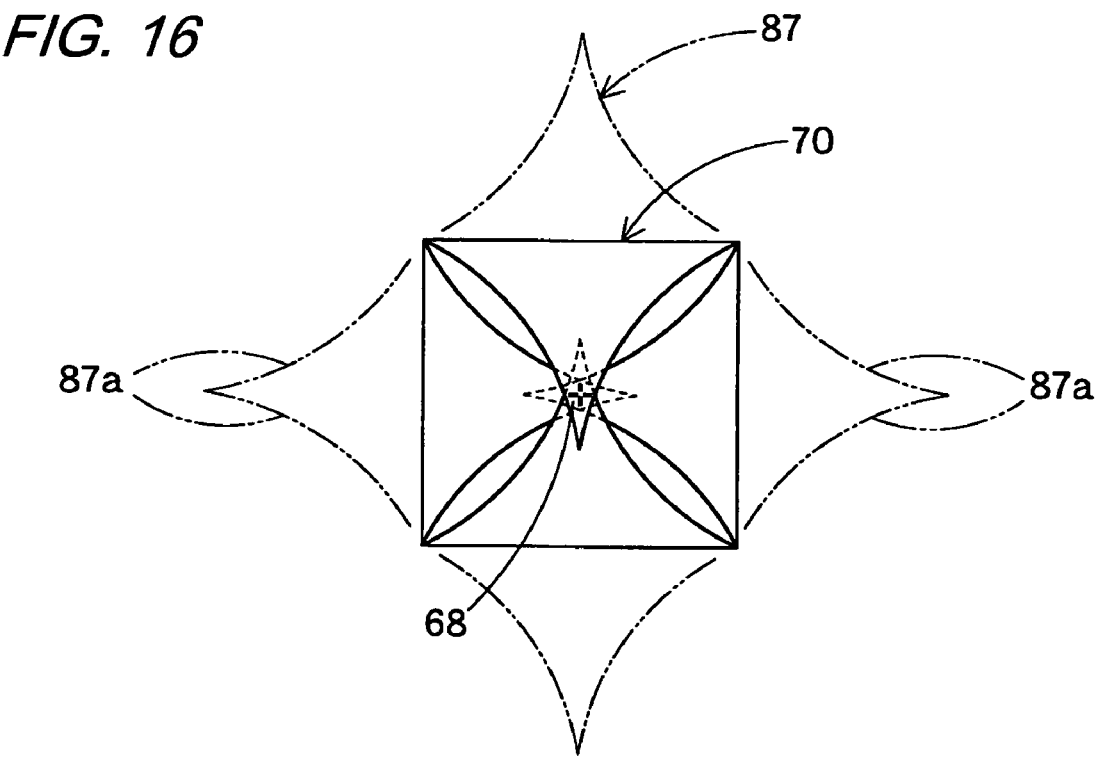
FIG. 16 is a plan view showing a modification of members to construct a slip cloth.

Also, in the airbag system M2 of the second embodiment, the slip cloth 60 is provided, when mutually approximating the end portions 62a, 63a, 64a, and 65a of the respective back panel portions 62, 63, 64, and 65, with an overlapping portion 68 where respective edge portions 62b, 63b, 64b, and 65b of the respective back panel portions 62, 63, 64, and 65 are mutually overlapped, however, as shown in FIG. 16, from a slip cloth raw material 87 whose respective sides 87a have been cut away in arc shapes, a slip cloth 70 whose overlapping portion 68 is small may be formed to construct the airbag system M2. As above, because an airbag system constructed 30 with the slip cloth 70 whose overlapping portion 68 is small allows folding up the airbag compact, it becomes possible to downsize the airbag system.

Figure 17:
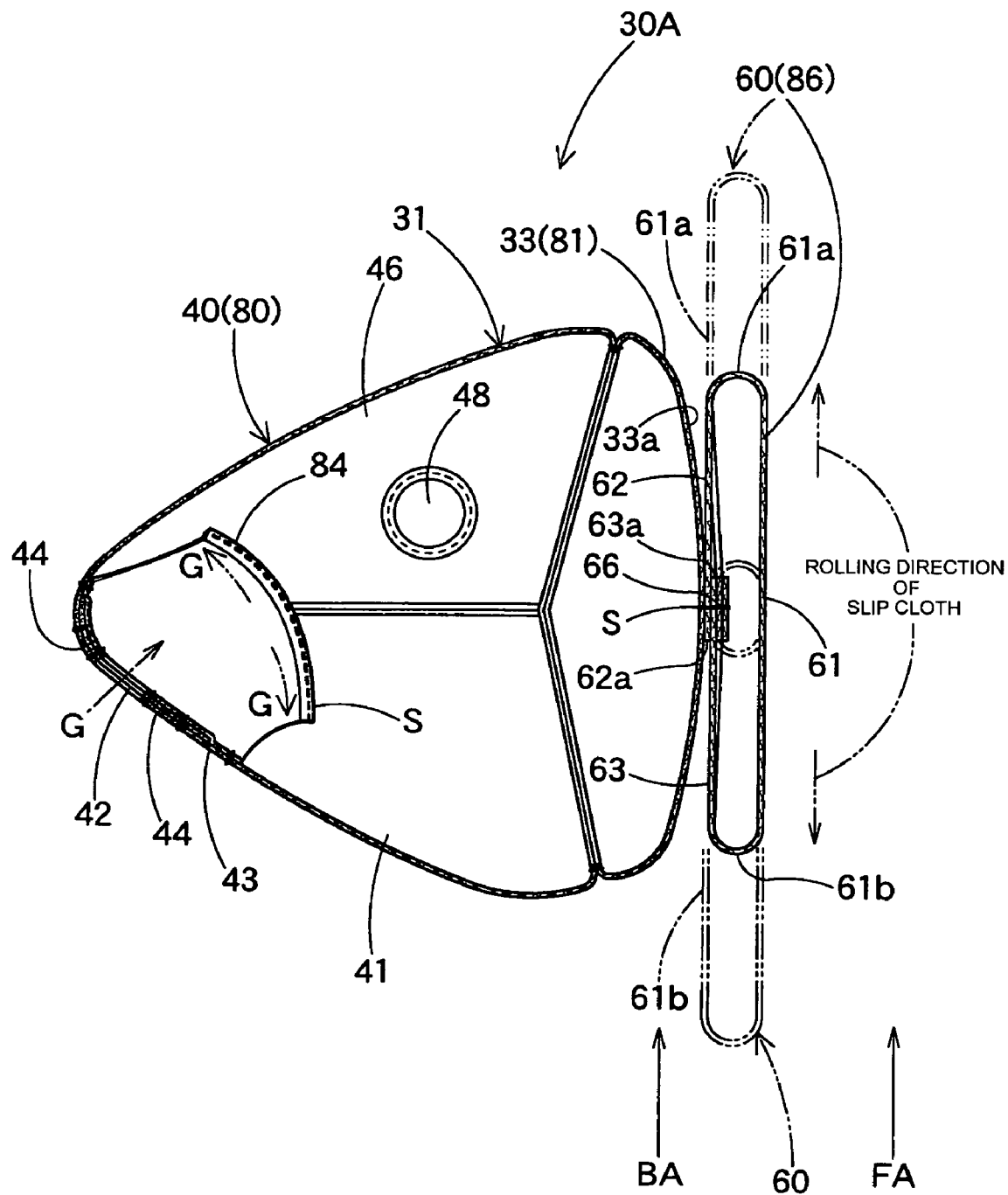
FIG. 17 is a sectional view in the front and rear direction of a vehicle of a state where an airbag to be used for the second embodiment has been solely inflated, which corresponds to a part along XVII-XVII of FIG. 14.
Figure 18:
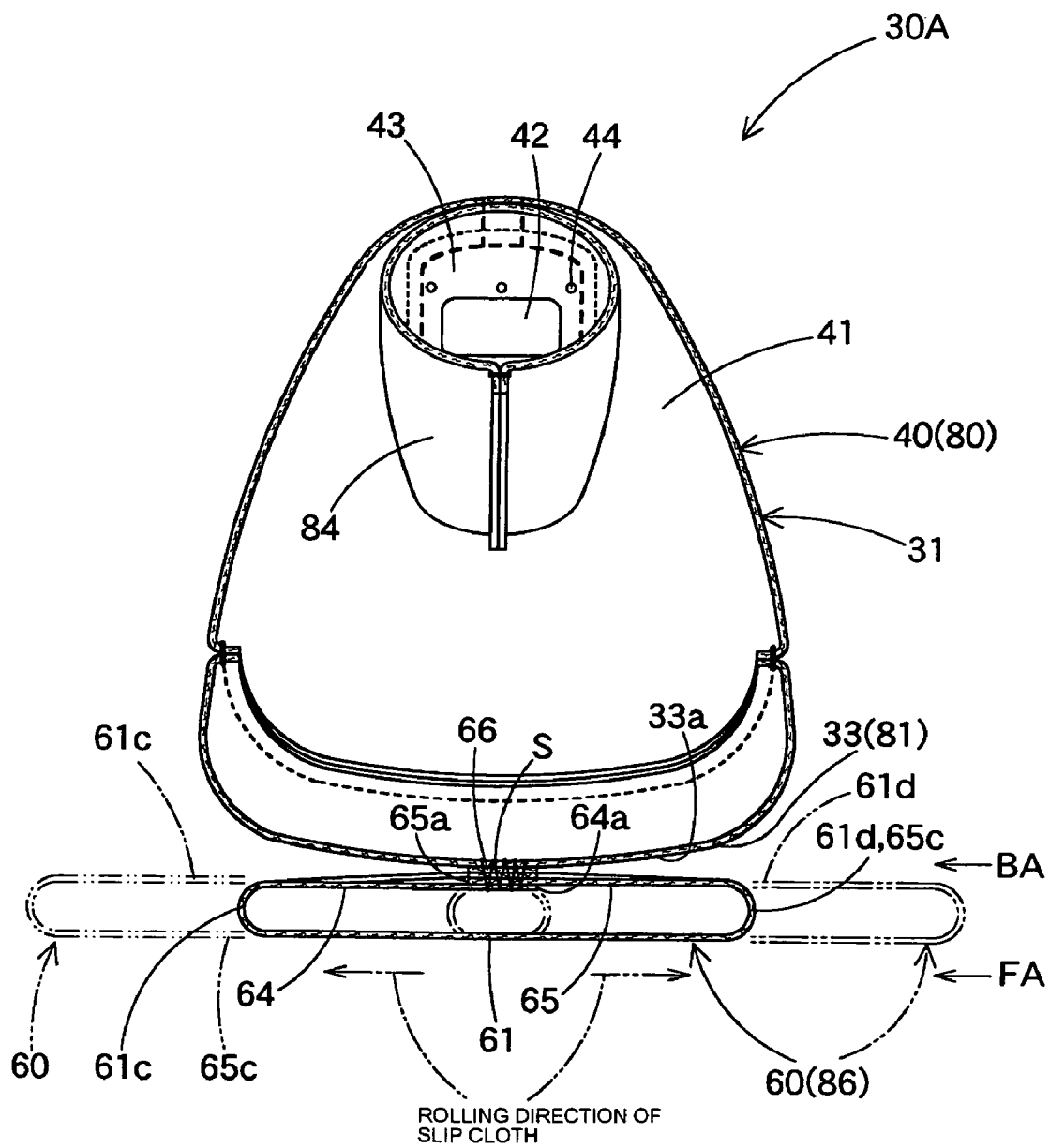
FIG. 18 is a sectional view in the left and right direction of a vehicle of a state where an airbag to be used for the second embodiment has been solely inflated, which corresponds to a part along XVIII-XVIII of FIG. 14.

In addition, according to the airbag system M2 thus constructed, because the slip cloth 60 can roll also in the left and right direction on the surface 33a of the passenger-side wall portion 33 as a result of the deploying and inflating of an airbag 30A, the slip cloth 60 is capable of not only a large shift movement of about ½ of the perimeter in the upper and lower direction of the slip cloth 60, as shown by alternate long and two short dashed lines in FIG. 17, in the upper and lower direction with respect to the passenger-side wall portion 33, but as shown by alternate long and two short dashed lines in FIG. 18, also in the left and right direction, a large shift movement of about ½ of the perimeter in the left and right direction of the slip cloth 60.

Figure 19A:
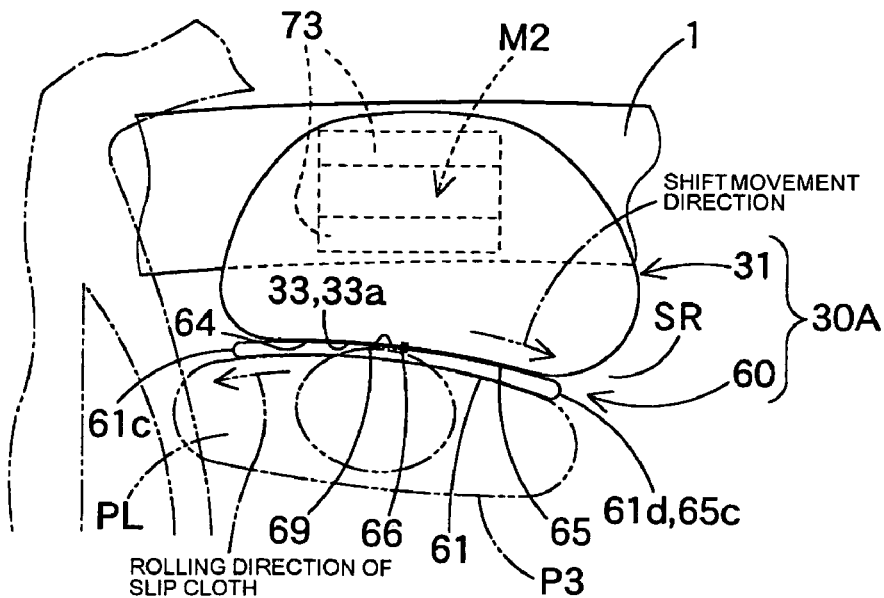
FIGS. 19A and 19B are views explaining an airbag system using the airbag of the second embodiment when being actuated, showing a state viewed from the upper side of a vehicle.
Figure 19B:
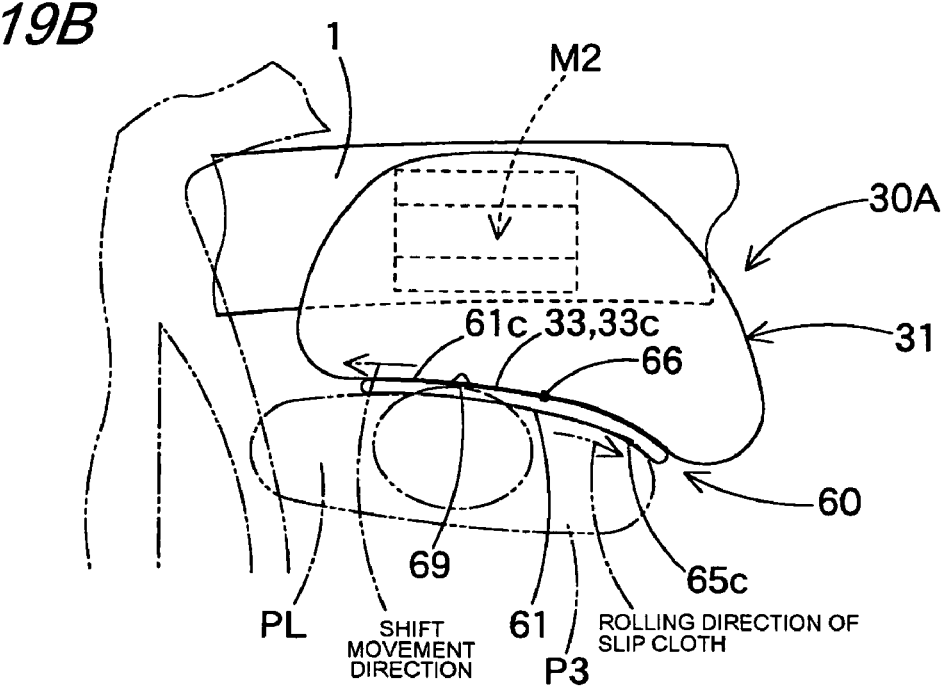

To explain concretely, for example, as shown in FIGS. 19A and 19B, when a passenger P3 biased to the left side in proximity to the instrument panel 1 contacts a left side of the front panel portion 61 of the slip cloth 60 at the initial time of inflation of the airbag 30A, the airbag body 31 inflates toward a large space SR at a right side of the passenger P3 so as to deploy the part at the right side large. More specifically, the passenger-side wall portion 33 of the airbag body 31, as a result of the deploying and inflating of the airbag 30A, attempts to shift and move rightward with respect to the passenger P3.

In this case, a contact portion 69 being in contact with the passenger P3 in the front panel portion 61 is integrated by frictional resistance or the like with the passenger P3 and does not move, and the left back panel portion 64 and the right back panel portion 65 and the upper back panel portion 62 and the lower back panel portion 63 at the back side of the contact portion 69 shift to move rightward with respect to the front panel portion 61.

In other words, when the passenger-side wall portion 33 attempts to shift and move rightward with respect to the passenger P3, the slip cloth 60 moves a joint portion 66 of the left back panel portion 64, the right back panel portion 65, the upper back panel portion 62, and the lower back panel portion 63 to the passenger-side wall portion 33 rightward along with the passenger-side wall portion 33 and shifts and moves the joint portion 66 with respect to the contact portion 69 of the front panel portion 61 with the passenger P3. More specifically, the slip cloth 60 rolls on the surface 33a of the passenger-side wall portion 33 so as to make the initial left end 61c side of the front panel portion 61 enter an area BA (see FIG. 18) of the initial left back panel portion 64 at the back side and make the initial right end 65c side of the right back panel portion 65 enter an area FA (see FIG. 18) of the initial front panel portion 61 at the front side.

Figure 20A:
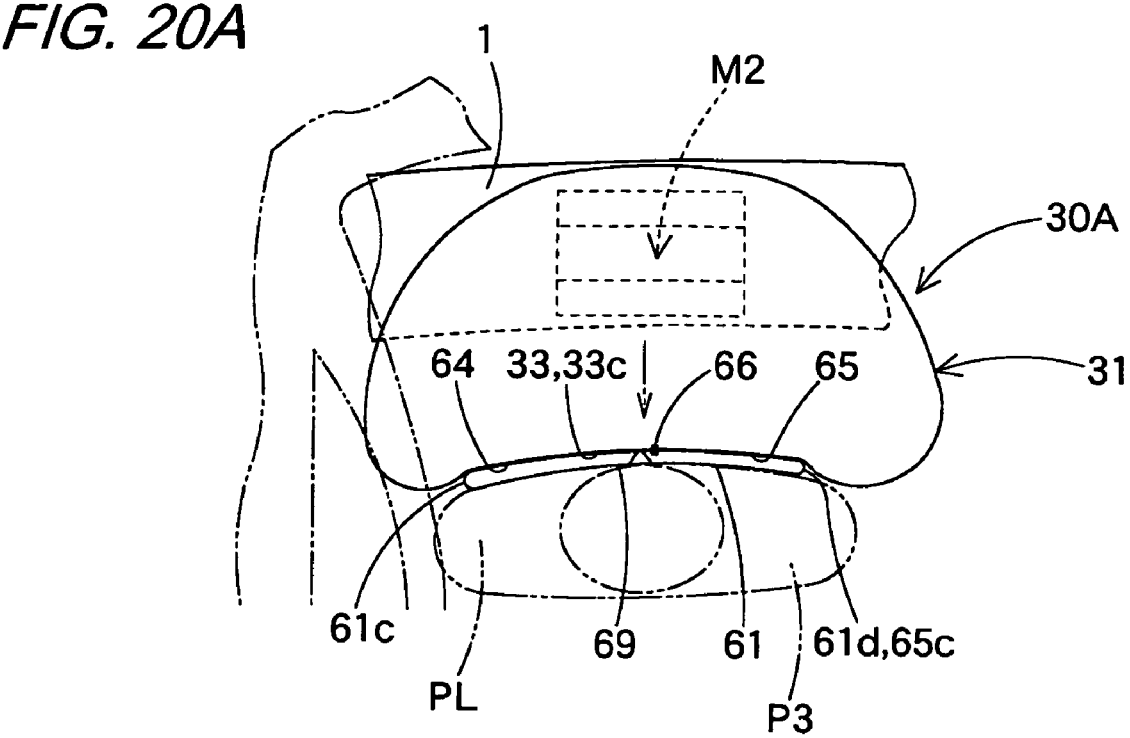
FIGS. 20A and 20B are views explaining an airbag system using the airbag of the second embodiment when being actuated, showing a state after that of FIG. 19.

Thereafter, as shown in FIGS. 19B and 20A, the airbag body 31 inflates the part at the left side so as to cover a left side PL of the passenger P3.

At this time, because the passenger-side wall portion 33 attempts to shift and move leftward with respect to the passenger P3 as a result of the deploying and inflating of the airbag 30A, the slip cloth 60 conversely moves the joint portion 66 leftward along with the passenger-side wall portion 33 and shifts and moves the joint portion 66 with respect to the contact portion 69. More specifically, the slip cloth 60 rolls on the surface 33a of the passenger-side wall portion 33 so as to move and make the right end 65c side of the right back panel portion 65 that has entered the area FA of the initial front panel portion 61 at the front side return to the area BA of the initial right back panel portion 65 at the back side and move and make the left end 61c side of the front panel portion 61 that has entered the area BA of the initial left back panel portion 64 at the back side return to the area FA of the initial front panel portion 61 at the front side.

Figure 20B:
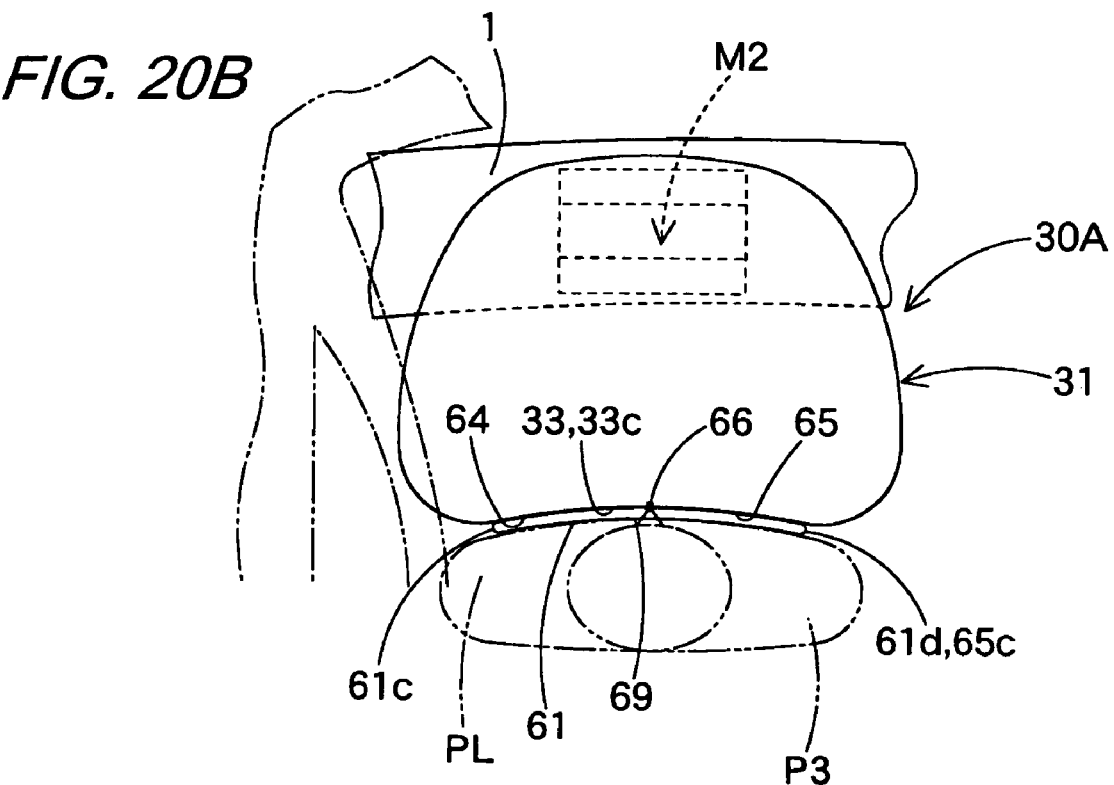

Then, as shown in FIGS. 20A and 20B1, the airbag body 31 smoothly completes inflation so as to enter between the instrument panel 1 and the passenger P3, and thereby arranges the passenger-side wall portion 33 at the front side of the passenger P3. Therefore, the passenger P3 that has been located biased to the left side, even if he/she hits at a position biased leftward with respect to the passenger-side wall portion 33 via the slip cloth 60 at the initial time of inflation of the airbag 30A, is received with excellent cushioning characteristics by the passenger-side wall portion 33 of the airbag body 31 that has completed inflation, and is thus satisfactorily protected.

Accordingly, in the airbag system M2 of the second embodiment, when the airbag 30A in the course of deploying and inflating contacts the passenger P3, the passenger-side wall portion 33 is capable of a shift movement not only in both upper and lower directions but also in both left and right directions, with respect to the passenger P3. In addition, even if the passenger P3 hits the passenger-side wall portion 33 of the airbag body 31 in the course of inflating in a biased manner not only upward and downward but also leftward and rightward with respect to the passenger-side wall portion 33 of the airbag body 31 in the course of inflating via the slip cloth 60, the airbag body 31 smoothly completes inflation, the passenger P3 is received with excellent cushioning characteristics by the passenger-side wall portion 33 that has completed inflation.

Also, in the airbag system M2 of the second embodiment, the right end 64a of the left back panel portion 64 and the left end 65a of the right back panel portion 65 have been attached by sewing while mutually approximated and overlapped, along with the lower end 62a of the upper back panel portion 62 and the upper end 63a of the lower back panel portion 63, in the vicinity of the center of the back side of the front panel portion 61, however, so long as not obstructing the area where the slip cloth 60 rolls on the passenger-side wall portion 33, in a mutually approximated state of the respective end portions 62a, 63a, 64a, and 65a without being overlapped, the respective end portion 62a, 63a, 64a, 65a sides may be separately attached by sewing to be joined to the passenger-side wall portion 33.

Moreover, in the airbag system M2 of the second embodiment, the right end 64a of the left back panel portion 64 and the left end 65a of the right back panel portion 65 are, along with the lower end 62a of the upper back panel portion 62 and the upper end 63a of the lower back panel portion 63, overlapped with the vicinity of the center of the passenger-side wall portion 33 and attached by sewing all together in consideration of efficiency of manufacturing man-hours of the airbag 30A, however, if this point is not taken into consideration, the respective end 62a, 63a, 64a, 65a sides of the respective back panel portions portion 62, 63, 64, and 65 may be sewn up in advance to form the slip cloth 60 in a loop shape, and then the slip cloth 60 may be sewn up to be joined with the passenger-side wall portion 33 at an arbitrary position on the outer surface.

Moreover, in the airbag system M2 of the second embodiment, the slip cloth 60 has been formed from the substantially regular square-shaped slip cloth raw material 86, however, the slip cloth raw material may not be quadrangular, but vicinities of the vertices of a slip cloth raw material in a polygonal shape such as pentagonal, hexagonal, or the like may be mutually overlapped in the vicinity of the center of the back side of the front panel portion.

Still moreover, in the airbag system M1, M2 of each embodiment, the slip cloth 50, 60 has been joined to the passenger-side wall portion 33 in the vicinity of the center of the passenger-side wall portion 33, however, the position where the slip cloth 50, 60 is joined to the passenger-side wall portion 33 may be shifted from the center of the passenger-side wall portion 33 as long as the slip cloth 50, 60 is capable of contacting the passenger P1, P2, P3 without the passenger-side wall portion 33 contacting the passenger P1, P2, P3 at the time of deploying and inflating of the airbag 30, 30A.

Moreover, in the airbag system M1, M2 of each embodiment, for the slip cloth 50, 60, the respective panel portions 51, 52, and 53, 61, 62, 63, 64, and 65 have been formed of one slip cloth raw material 85, 86, however, as a matter of course, the respective panel portions 51, 52, and 53, 61, 62, 63, 64, and 65 may be formed by joining a plurality of slip cloth raw materials.

Moreover, in the airbag system M1, M2 of each embodiment, the slip cloth 50, 60 has been formed of the slip cloth raw material 85, 86 woven from polyester yarn, polyamide yarn, or the like, however, the slip cloth 50, 60 is not limited to woven fabric, but may be made of other raw materials such as non-woven fabric and a sheet material made of synthetic resin. Also, the slip cloth is desirably formed of a raw material with low frictional resistance so that its mutually shifting and moving contact faces of the front-panel portion and the respective back panel portions can easily move.

Although, in the embodiment, a description has been given of the top-mount type passenger seat airbag system M1, M2 including the airbag 30, 30A to be folded and stored in a part at the upper face 1a of the instrument panel 1 in front of the passenger seat, the present invention may be applied to a mid-mount type passenger seat airbag system including an airbag to be folded and stored in a part at the lateral side of the instrument panel 1. Further, the present invention is by no means limited to a passenger seat airbag system, and may be applied to an airbag system to be mounted on a steering wheel or the like.

What is claimed is:

1. An airbag system including an airbag folded and stored and allowing an inflating gas ejected from an inflator to flow in so as to deploy and inflate,
    the airbag including an airbag body having a passenger-side wall portion that is arranged at a passenger side when having completed deploying and inflating, and a slip cloth that is disposed at an outer surface side of the passenger-side wall portion,
    the slip cloth formed in a loop shape an axial direction of which is in a left and right direction and comprising:
    a front panel portion arranged at a passenger side;
    an upper back panel portion facing the passenger-side wall portion at a back side of the front panel portion, and extending downward from an upper end of the front panel portion; and
    a lower back panel portion facing the passenger-side wall portion at the back side of the front panel portion and extending upward from a lower end of the front panel portion,
    wherein a lower end of the upper back panel portion and an upper end of the lower back panel portion are mutually approximated and joined to the passenger-side wall portion, the lower end of the upper back panel portion and the upper end of the lower back panel portion being jointed together along a line located in a vicinity of a center of the passenger-side wall portion.

2. The airbag system according to claim 1, wherein respective width dimensions in the left and right direction of the front panel portion, the upper back panel portion, and the lower back panel portion are made substantially identical from an upper end to a lower end of the slip cloth, and
    the lower end of the upper back panel portion and the upper end of the lower back panel portion are joined to the passenger-side wall portion across substantially the entire area in the left and right direction.

3. The airbag system according to claim 1, wherein
    the slip cloth comprises:
    a left back panel portion arranged on the passenger-side wall portion at a back side of the front panel portion and extending rightward from a left end of the front panel portion; and
    a right back panel portion arranged on the passenger-side wall portion at a back side of the front panel portion and extending leftward from a right end of the front panel portion, and
    a right end of the left back panel portion and a left end of the right back panel portion are mutually approximated, along with the lower end of the upper back panel portion and the upper end of the lower back panel portion, in the vicinity of a center of the back side of the front panel portion, and joined to the passenger-side wall portion.

4. The airbag system according to claim 1, wherein the lower end of the upper back panel portion and the upper end of the lower back panel portion are jointed together and to the passenger-side wall portion along the line by sewing.

* * * * *